(12) United States Patent
Harada et al.

(10) Patent No.: US 12,040,475 B2
(45) Date of Patent: Jul. 16, 2024

(54) ELECTRODE MATERIAL, ELECTRODE, SECONDARY BATTERY, BATTERY PACK, AND VEHICLE

(71) Applicant: KABUSHIKI KAISHA TOSHIBA, Tokyo (JP)

(72) Inventors: Yasuhiro Harada, Isehara (JP); Kazuomi Yoshima, Yokohama (JP); Norio Takami, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 85 days.

(21) Appl. No.: 17/155,343

(22) Filed: Jan. 22, 2021

(65) Prior Publication Data

US 2021/0376307 A1    Dec. 2, 2021

(30) Foreign Application Priority Data

May 28, 2020 (JP) .................. 2020-093105

(51) Int. Cl.
| | | |
|---|---|---|
| *H01M 4/131* | (2010.01) | |
| *C01G 33/00* | (2006.01) | |
| *H01M 4/134* | (2010.01) | |
| *H01M 10/0525* | (2010.01) | |
| *H01M 4/02* | (2006.01) | |

(52) U.S. Cl.
CPC .......... *H01M 4/131* (2013.01); *C01G 33/006* (2013.01); *H01M 4/134* (2013.01); *H01M 10/0525* (2013.01); *C01P 2002/74* (2013.01); *H01M 2004/027* (2013.01); *H01M 2220/20* (2013.01)

(58) Field of Classification Search
None
See application file for complete search history.

(56) References Cited

U.S. PATENT DOCUMENTS

2012/0052401 A1    3/2012    Goodenough et al.
2014/0295231 A1*   10/2014   Ise ................... C01G 49/0018
                                                        252/182.1
(Continued)

FOREIGN PATENT DOCUMENTS

| CN | 102694160 A | 9/2012 |
|---|---|---|
| JP | 2012099287 | 5/2012 |

(Continued)

OTHER PUBLICATIONS

European Office Action dated May 11, 2022, in European Patent Application No. 21151556.4, 3 pages.

(Continued)

*Primary Examiner* — Nathanael T Zemui
(74) *Attorney, Agent, or Firm* — Oblon, McClelland, Maier & Neustadt, L.L.P.

(57) ABSTRACT

According to one embodiment, an electrode material is provided. The electrode material includes active material particle containing: a niobium-titanium composite oxide having an average composition in which a molar ratio of niobium to titanium ($M_{Nb}/M_{Ti}$) is greater than 2; and at least one element A selected from the group consisting of potassium, iron and phosphorus. The active material particle contain the element A at a concentration in the range of 100 ppm to 2000 ppm.

20 Claims, 7 Drawing Sheets

(56) References Cited

U.S. PATENT DOCUMENTS

| | | | | |
|---|---|---|---|---|
| 2015/0364758 A1* | 12/2015 | Harada | ............ | H01M 50/10 |
| | | | | 429/231.1 |
| 2016/0276662 A1* | 9/2016 | Ise | ............ | H01M 10/0525 |
| 2017/0271667 A1 | 9/2017 | Yoshida et al. | | |
| 2018/0083269 A1* | 3/2018 | Iwasaki | ............ | H01M 10/425 |
| 2019/0088942 A1* | 3/2019 | Ise | ............ | C01G 33/006 |
| 2019/0296343 A1 | 9/2019 | Harada et al. | | |
| 2019/0296346 A1 | 9/2019 | Harada et al. | | |

FOREIGN PATENT DOCUMENTS

| | | |
|---|---|---|
| JP | 2014209445 | 11/2014 |
| JP | 2015111550 | 6/2015 |
| JP | 2017-059307 A | 3/2017 |
| JP | 2017-168352 A | 9/2017 |
| JP | 2018049705 A | 3/2018 |
| JP | 2019-169343 A | 10/2019 |
| JP | 2019-169399 A | 10/2019 |
| JP | 2019169348 | 10/2019 |
| JP | 2019169350 A | 10/2019 |

OTHER PUBLICATIONS

"Observations on EP3915941A1", May 4, 2022, 1 page.
"Certificate of analysis", ALFA AESAR, May 2022, 2 pages.
Qiushi Cheng, et al., "Bulk $Ti_2Nb_{10}O_{29}$ as long-life and high-power Li-ion battery anodes", Journal of Materials Chemistry A, (2014), pp. 17258-17262.
Gasperin "Affinement de la structure de $TiNb_2O_7$ et répartition des cations", Journal of Solid State Chemistry 53, 1984, 9 pages (with English Machine Translation).
Office Action dated Mar. 31, 2023, in corresponding European Patent Application No. 21151556.4.
Dale E. Newbury et al. "Performing elemental microanalysis with high accuracy and high precision by scanning electron microscopy/ silicon drift detector energy-dispersive X-ray spectrometry (SEM/ SDD-EDS)". J Mater Sci (2015) 50:493-518.
Observations on EP3915941A1/EP21151556.4 Mar. 2023 (7 pages).
Office Action mailed on Sep. 13, 2022, in corresponding European Patent Application No. 21151556.4.
Observations on EP3915941A1 Sep. 2022.
Further observations on EP3915941A1 Sep. 2022.
Material regarding the definition of the term "interface" available from website https://www.merriam-webster.com/dictionary/ interface.
Literature on SEM-EDX available from website https://www.sciencedirect.com/topics/chemistry/energy-dispersive-spectroscopy.
Office Action mailed on Mar. 5, 2024, in Japanese Patent Application No. 2020-093105.
Decision to Grant mailed on May 7, 2024, in corresponding Japanese Patent Application No. 2020-093105 (with English translation).

* cited by examiner

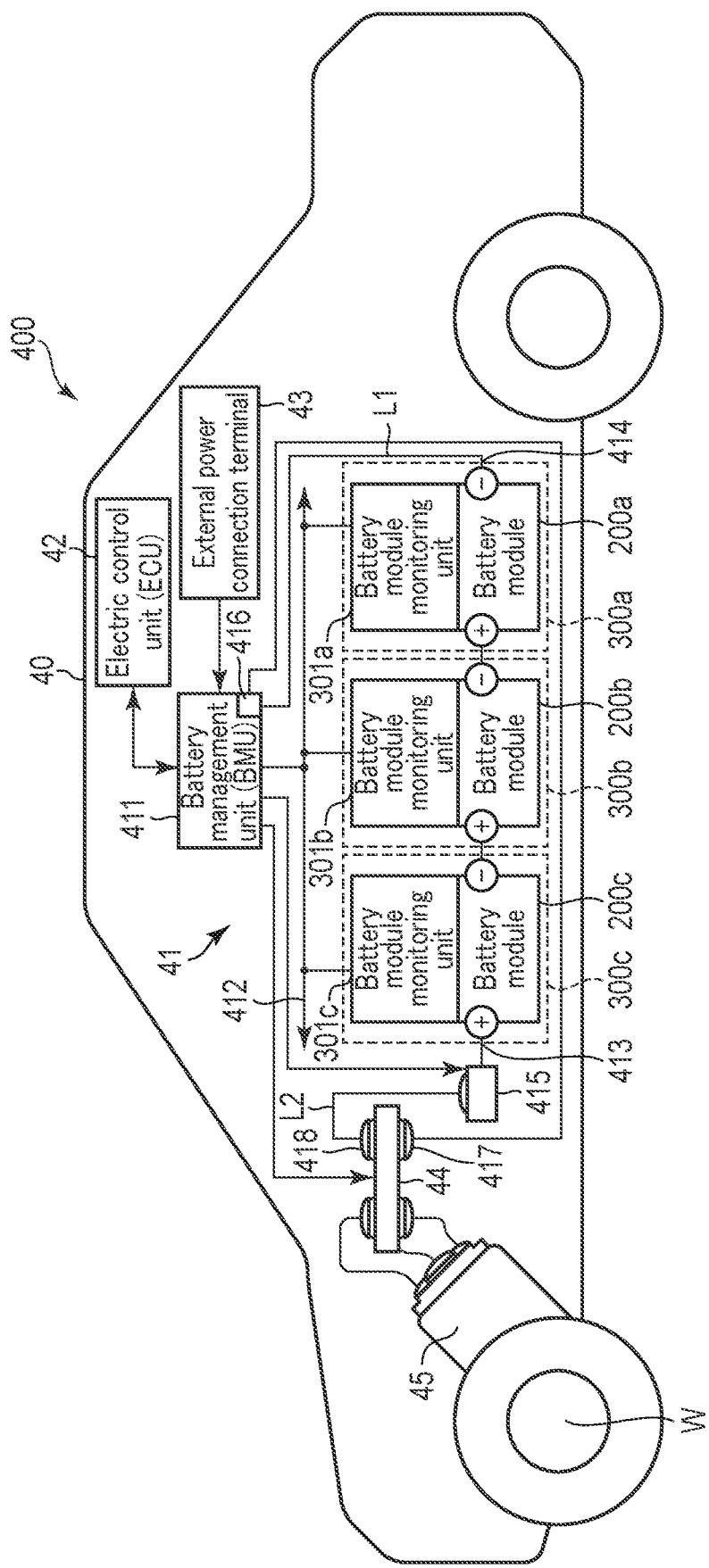
F I G. 11

ELECTRODE MATERIAL, ELECTRODE, SECONDARY BATTERY, BATTERY PACK, AND VEHICLE

CROSS-REFERENCE TO RELATED APPLICATIONS

This application is based upon and claims the benefit of priority from Japanese Patent Application No. 2020-093105, filed May 28, 2020, the entire contents of which are incorporated herein by reference.

FIELD

Embodiments described herein relate generally to an electrode material, an electrode, a secondary battery, a battery pack, and a vehicle.

BACKGROUND

Recently, secondary batteries, such as a nonaqueous electrolyte secondary battery like a lithium ion secondary battery, have been actively researched and developed as a high energy-density battery. The secondary batteries, such as a nonaqueous electrolyte secondary battery, are expected as a power source for vehicles such as hybrid electric automobiles and electric automobiles, an uninterruptible power supply for base stations for portable telephones, or the like. Also, because of the rapidly increasing demand for power sources for mobile services such as an autonomous-traveling industrial robot and a drone, the secondary batteries are required not only to have a high energy density, but also to have other performances such as rapid charge-discharge performances and long-term reliability. For example, not only is the charging time remarkably shortened in a secondary battery capable of rapid charge and discharge, but the battery is also capable of efficient recovery of regenerative energy of motive force, so that the daily operating time of a vehicle or device can be substantially extended significantly.

In order to enable rapid charge/discharge, electrons and lithium ions must be able to migrate rapidly between the positive electrode and the negative electrode. However, when a battery using a carbon-based negative electrode is repeatedly subjected to rapid charge and discharge, precipitation of dendrite of metallic lithium on the electrode may sometimes occur, raising concern of heat generation or ignition due to internal short circuits.

Therefore, a battery using a metal composite oxide in a negative electrode instead of a carbon-based active material has been developed. Among them, a battery using a titanium oxide in a negative electrode has characteristics of enabling stable rapid charge-discharge and having a longer life than in the case of using a carbon-based negative electrode.

However, compared to carbonaceous materials, oxides of titanium have a higher potential relative to metallic lithium. That is, oxides of titanium are more noble. Furthermore, oxides of titanium have a lower capacity per weight. Therefore, a battery using an oxide of titanium for the negative electrode has a problem that the energy density is low.

For example, the electrode potential an oxide of titanium is about 1.5 V (vs. Li/Li$^+$) relative to metallic lithium, which is higher (i.e., more noble) in comparison to potentials of carbon based negative electrodes. The potential of an oxide of titanium is attributed to the redox reaction between Ti$^{3+}$ and Ti$^{4+}$ upon electrochemical insertion and extraction of lithium, and is therefore electrochemically restricted. It is also a fact that rapid charge/discharge of lithium ions can be performed stably at a high electrode potential of about 1.5 V (vs. Li/Li$^+$). Conventionally, it has therefore been difficult to drop the potential of the electrode in order to improve the energy density.

On the other hand, considering the capacity per unit weight, the theoretical capacity of titanium dioxide (anatase structure) is about 165 mAh/g, and the theoretical capacity of spinel type lithium-titanium composite oxides such as Li$_4$Ti$_5$O$_{12}$ is about 180 mAh/g. On the other hand, the theoretical capacity of a general graphite based electrode material is 385 mAh/g and greater. As such, the capacity density of an oxide of titanium is significantly lower than that of the carbon based negative electrode material. This is due to there being only a small number of lithium-insertion sites in the crystal structure, and lithium tending to be stabilized in the structure, and thus, substantial capacity being reduced.

In consideration of the above circumstances, a new electrode material containing Ti and Nb has been studied. Such a niobium-titanium composite oxide material is expected to have a high charge/discharge capacity. Particularly, a composite oxide represented by TiNb$_2$O$_7$ has a high theoretical capacity exceeding 380 mAh/g. Therefore, a niobium-titanium composite oxide is expected as a high-capacity material to replace Li$_4$Ti$_5$O$_{12}$, but there is a problem that, since lithium ions are inserted to and extracted from the crystal structure during rapid charge and charge-and-discharge cycles, the skeleton of the crystal structure greatly changes, leading to low life characteristics.

BRIEF DESCRIPTION OF THE DRAWINGS

FIG. 11 is a diagram schematically illustrating another example of the vehicle according to the embodiment.

DETAILED DESCRIPTION

Figure 1:
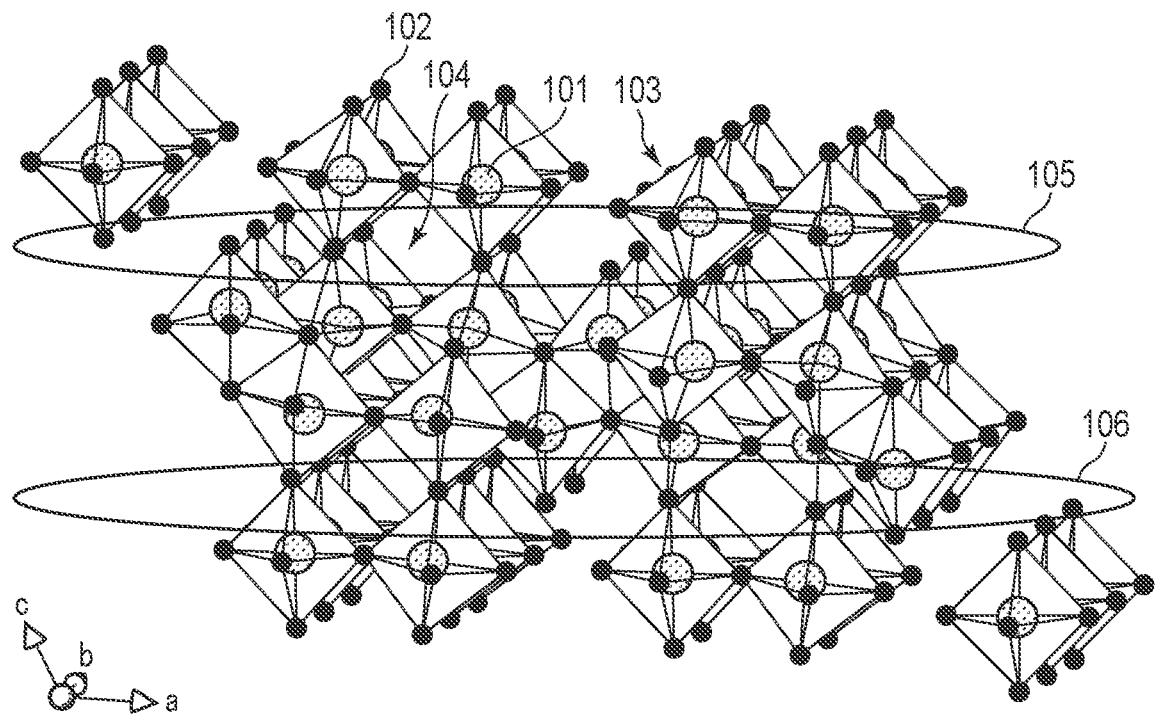
FIG. 1 is a schematic view illustrating a crystal structure of monoclinic Nb$_2$TiO$_7$.

According to an embodiment, an electrode material is provided. The electrode material includes active material particle containing: a niobium-titanium composite oxide having an average composition in which a molar ratio of niobium to titanium (M$_{Nb}$/M$_{Ti}$) is greater than 2; and at least one element A selected from the group consisting of potassium, iron and phosphorus. The active material particle contain the element A at a concentration in the range of 100 ppm to 2000 ppm.

According to another embodiment, an electrode is provided. The electrode includes the electrode material according to the embodiment.

According to another embodiment, a secondary battery is provided. The secondary battery includes a negative electrode, a positive electrode, and an electrolyte. The negative electrode is the electrode according to the embodiment.

According to another embodiment, a battery pack is provided. The battery pack includes the secondary battery according to the embodiment.

According to another embodiment, a vehicle is provided. The vehicle includes the battery pack according to the embodiment.

Hereinafter, embodiments will be described with reference to the drawings. The same reference signs are applied to common components throughout the embodiments and overlapped explanations are thereby omitted. Each drawing is a schematic view for encouraging explanations of the embodiment and understanding thereof, and thus there are some details in which a shape, a size and a ratio are different from those in a device actually used, but they can be appropriately design-changed considering the following explanations and known technology.

First Embodiment

According to a first embodiment, an electrode material is provided. The electrode material includes active material particle containing: a niobium-titanium composite oxide having an average composition in which a molar ratio of niobium to titanium ($M_{Nb}/M_{Ti}$) is greater than 2; and at least one element A selected from the group consisting of potassium, iron and phosphorus. The active material particle contain the element A at a concentration in the range of 100 ppm to 2000 ppm.

As an example of the niobium-titanium composite oxide having an average composition in which the molar ratio of niobium to titanium ($M_{Nb}/M_{Ti}$) is greater than 2, a niobium-titanium composite oxide having an $Nb_{10}Ti_2O_{29}$ phase, an $Nb_{14}TiO_{37}$ phase and an $Nb_{24}TiO_{62}$ phase can be indicated. In the present specification and claims, "$M_{Nb}$" refers to the amount of substance (number of moles) of niobium atoms contained in the niobium-titanium composite oxide, and "$M_{Ti}$" refers to the amount of substance (number of moles) of titanium atoms contained in the niobium-titanium composite oxide. These crystal phases have, for example, a monoclinic crystal structure. The $Nb_{10}Ti_2O_{29}$ phase can also have an orthorhombic crystal structure.

As another example of a crystal phase included in the niobium-titanium composite oxide having an average composition in which a molar ratio ($M_{Nb}/M_{Ti}$) is greater than 2, an $Nb_2TiO_7$ phase having a molar ratio ($M_{Nb}/M_{Ti}$) of greater than 2 can be indicated. In the $Nb_2TiO_7$ phase having a composition having a molar ratio ($M_{Nb}/M_{Ti}$) of greater than 2, a part of titanium in the $Nb_2TiO_7$ phase is elementally substituted with niobium. The $Nb_2TiO_7$ phase having a composition having a molar ratio ($M_{Nb}/M_{Ti}$) of greater than 2, has, for example, a monoclinic crystal structure. In the present specification, the "molar ratio of niobium to titanium ($M_{Nb}/M_{Ti}$)" may be described as "Nb/Ti ratio".

The $Nb_2TiO_7$ phase means a crystal phase attributed to the crystal structure of $Nb_2TiO_7$. The $Nb_{10}Ti_2O_{29}$ phase means a crystal phase attributed to the crystal structure of $Nb_{10}Ti_2O_{29}$. The $Nb_{14}TiO_{37}$ phase means a crystal phase attributed to the crystal structure of $Nb_{14}TiO_{37}$. The $Nb_{24}TiO_{62}$ phase means a crystal phase attributed to the crystal structure of $Nb_{24}TiO_{62}$.

A basic skeleton forming a crystal of the niobium-titanium composite oxide having an average composition having the Nb/Ti ratio of greater than 2 can be at least one kind selected from the group consisting of an $Nb_2TiO_7$ phase which have an Nb/Ti ratio of greater than 2, an $Nb_{10}Ti_2O_{29}$ phase, an $Nb_{14}TiO_{37}$ phase and an $Nb_{24}TiO_{62}$ phase. In other words, the niobium-titanium composite oxide having an average composition in which the Nb/Ti ratio is greater than 2 includes at least one kind of crystal phase selected from the group consisting of an $Nb_2TiO_7$ phase which have an Nb/Ti ratio of greater than 2, an $Nb_{10}Ti_2O_{29}$ phase, an $Nb_{14}TiO_{37}$ phase and an $Nb_{24}TiO_{62}$ phase. The niobium-titanium composite oxide having an average composition in which the Nb/Ti ratio is greater than 2 may include two or more types of these four crystal phases. That is, the niobium-titanium composite oxide having an average composition in which the Nb/Ti ratio is greater than 2 may include a mixed phase containing two or more kinds of crystal phases having a composition in which the Nb/Ti ratio is greater than 2.

The electrode material according to the embodiment may separately contain a niobium-titanium composite oxide having a molar ratio of niobium to titanium ($M_{Nb}/M_{Ti}$) of 2.

When the $Nb_2TiO_7$ phase which have a composition in which the Nb/Ti ratio is greater than 2, $Nb_{10}Ti_2O_{29}$ phase, $Nb_{14}TiO_{37}$ phase or $Nb_{24}TiO_{62}$ phase has a monoclinic crystal structure, they have a structure similar to a crystal structure of monoclinic $Nb_2TiO_7$.

Figure 2:
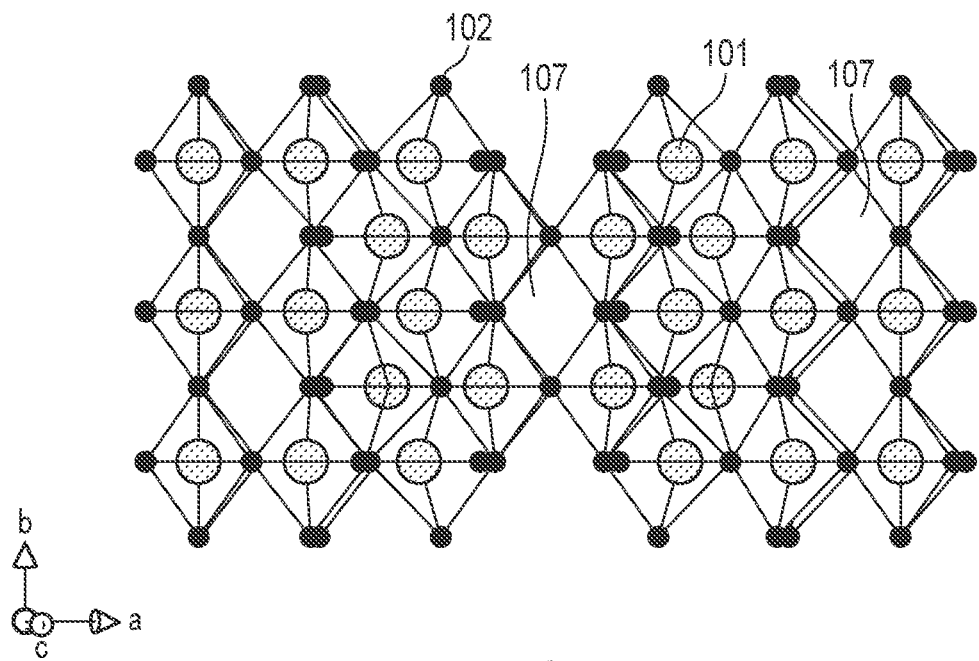
FIG. 2 is a schematic view illustrating the crystal structure of FIG. 1 when observed from another direction.

FIGS. 1 and 2 illustrate a skeleton structure of monoclinic $Nb_2TiO_7$. FIG. 1 is a schematic view illustrating a crystal structure of monoclinic $Nb_2TiO_7$. FIG. 2 is a schematic view illustrating the crystal structure of FIG. 1 when observed from another direction. Monoclinic $Nb_2TiO_7$ is a niobium-titanium composite oxide having a molar ratio of niobium to titanium ($M_{Nb}/M_{Ti}$) of 2.

As illustrated in FIG. 1, in the crystal structure of the monoclinic niobium-titanium composite oxide $Nb_2TiO_7$, a metal ion 101 and an oxide ion 102 form a skeleton structure section 103. At a position of the metal ion 101, Nb ions and Ti ions are randomly arranged at a ratio of Nb:Ti=2:1. Such skeleton structure sections 103 are alternately arranged three-dimensionally, thereby vacancies 104 are formed among the skeleton structure sections 103. These vacancies 104 serve as hosts for lithium ions. As illustrated in FIG. 1, the vacancies 104 can occupy a major portion of the entire crystal structure. In addition, the vacancies 104 can maintain the structure stably even when lithium ions are inserted.

In FIG. 1, regions 105 and 106 are sections having two-dimensional channels in [100] and [010] directions. As illustrated in FIG. 2, the crystal structure of the monoclinic niobium-titanium composite oxide has a vacancy 107 along a [001] direction. This vacancy 107 has a tunnel structure advantageous in conduction of lithium ions and serves as an electrically conductive path in the [001] direction connecting the regions 105 and 106. This electrically conductive path makes it possible for lithium ions to migrate between the regions 105 and 106.

As described above, the crystal structure of the monoclinic niobium-titanium composite oxide $Nb_2TiO_7$ has large equivalent insertion spaces for lithium ions and is structurally stable, and further includes two-dimensional channels in which lithium ions diffuse quickly and an electrically conductive path in the [001] direction connecting them. Thus, in the crystal structure of the monoclinic niobium-titanium composite oxide $Nb_2TiO_7$, the insertion and extraction of lithium ions into and from the insertion spaces is improved, and the insertion and extraction spaces for lithium ions are effectively increased. This makes it possible to provide high capacity and high rate performance.

Further, when a lithium ion is inserted into the vacancy 104 in the above crystal structure, the metal ion 101, which forms the skeleton 103, is reduced to a trivalent, thereby maintaining electric neutrality of a crystal. In the monoclinic niobium-titanium composite oxide, not only a Ti ion is reduced from tetravalent to trivalent, but also an Nb ion is reduced from pentavalent to trivalent. That is, the number of reduced valences per active material weight is large. Therefore, the niobium-titanium composite oxide can maintain electric neutrality of the crystal even if many lithium ions are inserted. Thus, energy density is higher in the monoclinic niobium-titanium composite oxide as compared with that of a compound such as titanium oxide only containing a tetravalent cation. Specifically, the theoretical capacity of the monoclinic niobium-titanium composite oxide is about 387 mAh/g, which is more than twice the value of titanium oxide having a spinel structure.

The niobium-titanium composite oxide has a lithium insertion potential of about 1.5V (vs. Li/Li$^+$). Therefore, an electrode material containing the monoclinic niobium-titanium composite oxide can realize a battery that can stably repeat rapid charging and discharging.

Further, the niobium-titanium composite oxide having an average composition in which the Nb/Ti ratio is greater than 2 can realize a secondary battery capable of exhibiting excellent rapid charge-discharge characteristics and cycle life characteristics for the reasons which will be described below.

The niobium-titanium composite oxide having an average composition in which the Nb/Ti ratio is greater than 2 has a larger amount of Nb than in the $Nb_2TiO_7$ phase having an Nb/Ti ratio of 2. Therefore, the crystal phase having a composition in which the Nb/Ti ratio is greater than 2 includes more bonds between Nb and oxygen (Nb—O) forming the skeleton. The bonding force between the pentavalent cation Nb and oxygen (Nb—O) is stronger than the bonding force between the tetravalent cation Ti and oxygen (Ti—O). Therefore, a crystal phase having a composition in which the Nb/Ti ratio is greater than 2 can maintain the skeleton structure of the crystal more stably even when lithium ions are inserted, as compared with $Nb_2TiO_7$ having an Nb/Ti ratio of 2. That is, the niobium-titanium composite oxide having an average composition in which the Nb/Ti ratio is greater than 2 is excellent in life performance in rapid charging and discharging and repeated charging and discharging.

Also, in the orthorhombic $Nb_{10}Ti_2O_{29}$ phase and the $Nb_2TiO_7$ phase having a composition in which the Nb/Ti ratio is greater than 2 due to elemental substitution, the bonding force between Nb and O is stronger than the bonding force between Ti and O, and thus the same effect can be obtained.

On the other hand, a niobium-titanium composite oxide including a crystal phase having a composition in which the Nb/Ti ratio is greater than 2 tends to be difficult to grind because the sintering of the particles easily proceeds. This tendency is likely to appear when it is synthesized industrially. It is considered that the difficulty in grinding is due to the strong bonding force between Nb and O, which tends to result in high hardness and hard particles. Also when niobium or titanium in the crystal structure is substituted with a heteroelement other than niobium, titanium and tantalum, sintering easily proceeds. Here, the heteroelement do not include potassium, iron or phosphorus. Specifically, the heteroelement referred to herein refers to an element other than niobium, titanium, tantalum, potassium, iron and phosphorus. Since tantalum has properties very similar to those of niobium and titanium, it is known that the properties of the crystal structure is unlikely to change even if niobium or titanium is substituted by tantalum. Therefore, a crystal phase having a composition in which the Nb/Ti ratio is greater than 2 tends to form coarse and hard particles as compared with the $Nb_2TiO_7$ phase having an Nb/Ti ratio of 2.

In order to obtain active material particle having excellent rapid charge-discharge performances, high crystallinity and a small particle size are required. Conventionally, when grinding the niobium-titanium composite oxide including a crystal phase having a composition in which the Nb/Ti ratio is greater than 2, it is necessary to apply a strong force at the time of grinding for the above reason, so that problems of lower crystallinity and inferior rapid charge-discharge performances are caused. Further, a fine powder having a size of less than 0.2 μm produced by strong grinding does not contribute to charging and discharging and may contribute to a decrease in charge-discharge efficiency and a deterioration in life performance, so that a problem of lower charge-and-discharge cycle is caused.

In the electrode material according to the embodiment, the active material particle containing a niobium-titanium composite oxide having an average composition in which the Nb/Ti ratio is greater than 2 further contain at least one kind of element A selected from the group consisting of potassium, iron and phosphorus. The element A, for example, exists in a solid solution state in the niobium-titanium composite oxide. Since the concentration of the element A is in the range of 100 ppm to 2000 ppm, a part of the bonding force between Nb and O is weakened. This is because at least one of Nb—K—O bonds, Nb—Fe—O bonds and Nb—P—O bonds is formed in the crystal. Nb—K—O bonds, Nb—Fe—O bonds and Nb—P—O bonds all have weaker bond strength than that of Nb—O bonds. Therefore, only weaker grinding than in the case where the element A is not contained makes it possible to make coarse particles smaller, without lowering the crystallinity of the niobium-titanium composite oxide, and to suppress the generation of a fine powder having a size of less than 0.2 μm produced by grinding.

Furthermore, a part of the bonding force between Nb and O is weakened inside the crystal, so that, when lithium ions diffuse in the crystal, the effect of mitigating structural changes in the vicinity of the element A having a weak bonding force without destroying the basic skeleton structure can be expected. Therefore, the crystal structure can be stably maintained even during repeated charging and discharging, so that a long life can be expected.

When the element A is potassium, the crystal that forms the niobium-titanium composite oxide includes Nb—K—O bonds therein. In this case, potassium not only can weaken the bond between niobium and an oxide ion, but also fills in defects in the lattice where lithium ions are likely to be trapped, and thus has the effect of improving charge-discharge performances.

When the element A is iron, the crystal that forms the niobium-titanium composite oxide includes Nb—Fe—O bonds therein. In this case, the electron orbit of iron ions effectively weakens the bond between niobium and an oxide ion, and also has the effects of improving the electron conductivity and lowering the electrode resistance.

When the element A is phosphorus, the crystal that forms the niobium-titanium composite oxide includes Nb—P—O bonds therein. In this case, because of a high covalent bond between phosphorus and an oxide ion, there is an effect of most effectively weakening the bond between niobium and the oxide ion.

If the concentration of the element A is less than 100 ppm, it is difficult to obtain the effect of weakening the bonding force between Nb and O. If the concentration of the element A exceeds 2000 ppm, only a specific crystal axis tends to grow, so that coarse particles are generated, which is not preferable. The concentration of the element A is preferably in the range of 200 ppm to 1500 ppm. The concentration of the element A represents the mass [mg/kg] of the element A contained in a solid, for example, the mass of the element A contained in the active material particle. The concentration of the element A can be analyzed by inductively coupled plasma (ICP) emission spectroscopy, which will be described later.

The element A may be present substantially evenly throughout the active material particle, but is preferably present at the highest concentration at the particle interface. Due to the high concentration of the element A at the particle interface, coarse particle can be made smaller with a weaker grinding force after firing. Thus, a large crystallite diameter can be maintained.

As a result of the above, the electrode material according to the embodiment contains active material particle having high crystallinity and a stable basic skeleton, has a low proportion of fine powder, and thus can exhibit excellent rapid charge-discharge characteristics and cycle life characteristics. The electrode material according to the embodiment may consist of only the active material particle. The electrode material may include one or more of the active material particle.

Hereinafter, the electrode material according to the embodiment will be described in more detail.

The electrode material includes, as an active material, a niobium-titanium composite oxide having an average composition in which the Nb/Ti ratio is greater than 2.

The composition of the $Nb_2TiO_7$ phase having a composition in which the molar ratio of niobium to titanium (Nb/Ti) is greater than 2 can be represented, for example, by the general formula $Nb_2M2_zTi_{1-z}O_7$, where z satisfies $0<z<1$. Further, the composition when Li is inserted into the $Nb_2TiO_7$ phase having a composition in which the Nb/Ti ratio is greater than 2 can be represented by $Li_dNb_2M2_zTi_{1-z}O_7$ ($0 \leq d \leq 5$).

The composition of the $Nb_{10}Ti_2O_{29}$ phase can be represented, for example, by the general formula $Nb_{10-x}M1_xTi_{2-y}M2_yO_{29}$. The composition when lithium ions are inserted into the $Nb_{10}Ti_2O_{29}$ phase can be represented by $Li_aNb_{10-x}M1_xTi_{2-y}M2_yO_{29}$ ($0 \leq a \leq 22$).

The composition of the $Nb_{14}TiO_{37}$ phase can be represented, for example, by the general formula $Nb_{14-x}M1_xTi_{1-y}M2_yO_{37}$. The composition when lithium ions are inserted into the $Nb_{14}TiO_{37}$ phase can be represented by $Li_bNb_{14-x}M1_xTi_{1-y}M2_yO_{37}$ ($0 \leq b \leq 29$).

The composition of the $Nb_{24}TiO_{62}$ phase can be represented, for example, by the general formula $Nb_{24-x}M1_xTi_{1-y}M2_yO_{62}$. The composition when lithium ions are inserted into the $Nb_{24}TiO_{62}$ phase can be represented by $Li_cNb_{24-x}M1_xTi_{1-y}M2_yO_{62}$ ($0 \leq c \leq 49$).

In the above general formulas, M1 is at least one kind of additive element selected from the group consisting of Ta, Ti, V, Mo and W; M2 is at least one kind of additive element selected from the group consisting of Nb, Ta, Zr, Hf and Sn;

x satisfies $0 \leq x \leq 5$; and y satisfies $0 \leq y < 1.0$. When the niobium-titanium composite oxide contains Ta, the crystal forming the niobium-titanium composite oxide may include Nb—Ta—O bonds therein. In this case, when lithium is inserted into the crystal structure, niobium is preferentially redoxed, but tantalum maintains the bond with an oxide ion and thus has an effect of stabilizing the crystal structure.

A composition in which the Nb/Ti ratio is greater than 2 is preferred because the electron conductivity can be enhanced. If x is greater than 5, the amount of Nb to be reduced by insertion of Li will be less than the number of Li host sites, which may result in lower electrode capacitance. If y is greater than 1.0, the skeleton structure may become unstable, which may result in lower cycle life.

<Form>

The form of the active material particle (active material) contained in the electrode material according to the embodiment is not particularly limited. The active material particle can take the form of, for example, a primary particle, and also can take the form of a secondary particle obtained by aggregation of primary particles. The active material particles may be a mixture of a primary particle and a secondary particle. The electrode material may include at least one primary particle as the active material particle. The electrode material may include at least one secondary particle as the active material particle.

The active material particle may have a carbon-containing layer on the surface. The element A exists inside relative to the carbon-containing layer. The carbon-containing layer may be attached to the surface of the primary particle or may be attached to the surface of the secondary particle. Alternatively, the active material particle may contain secondary particle obtained by aggregation of primary particles having a carbon-containing layer attached to the surface. Such secondary particle have carbon between the primary particles, and thus can exhibit excellent electrical conductivity. An embodiment containing such secondary particle is preferred because an active material-containing layer can exhibit lower resistance.

<Particle Size>

The active material particles contained in the electrode material preferably have a volume frequency of 10% (D10) in the range of 0.3 μm to 2.0 μm in a grain size distribution chart obtained by a laser diffraction/scattering method. When D10 is smaller than 0.3 μm, side reactions with an electrolytic solution increase, and the charge-discharge efficiency and cycle life performance tend to decrease. If D10 is greater than 2.0 μm, the rapid charge-discharge performances tend to be low. D10 is more preferably in the range of 0.5 μm to 1.0 μm.

Further, in the grain size distribution chart, the volume frequency of 90% (D90) is preferably in the range of 5 μm to 30 μm. If the D90 is smaller than 5 μm, the electrode tends to peel off from the current collector and the life performance tends to decrease. If the D90 is larger than 30 μm, the rapid charge-discharge performances tend to be low. More preferably, D90 is in the range of 6 μm to 10 μm.

A high D10 value means less fine powder, and a low D90 value means less coarse particles. In other words, it means that the grain size distribution tends to be sharp. It is not always preferable that the grain size distribution is sharp, but whether the grain size distribution is sharp can be evaluated based on the value of a ratio of D10 to the volume frequency of 50% (D50) and the value of a ratio of D90 to D50.

It is preferable that the ratio D10/D50 be in the range of 0.10 to 0.60 and that the ratio D50/D90 be in the range of 0.20 to 0.50. This leads to dispersion of the active material particles having a small particle size in gaps among the active material particles having a large particle size, so that the diffusion distance of the lithium ions in the crystal can be reduced. Therefore, it is possible to achieve excellent life performance while improving rapid charge-discharge performances. If the ratio D10/D50 is smaller than 0.1 or the ratio D50/D90 is smaller than 0.20, the grain size is biased, thereby making it difficult to increase the electrode density. It is preferable that the ratio D10/D50 be in the range of 0.15 to 0.30 and that the ratio D50/D90 be in the range of 0.20 to 0.40. If the value of the ratio D10/D50 is greater than 0.60, or the ratio of D50/D90 is greater than 0.50, the flexibility of the electrode will be impaired, so that it may be difficult to make the electrode into a wound body.

The D50 of the active material particles according to the embodiment is not particularly limited, but is, for example, in the range of 0.5 μm to 30 μm.

The active material particles described above may be secondary particles formed from the primary particles. In this case, the particle size of the secondary particles is not particularly limited.

<Crystallinity>

A crystallite diameter of the niobium-titanium composite oxide having an average composition in which the Nb/Ti ratio is greater than 2 is, for example, in the range of 50 nm to 130 nm, preferably in the range of 95 nm to 130 nm. In this case, the electrode material can achieve excellent rapid charge-discharge characteristics.

Furthermore, it is preferable that the niobium-titanium composite oxide including the $Nb_2TiO_7$ phase having a composition in which the Nb/Ti ratio is greater than 2 has two peaks appearing at $2\theta=44°\pm1.0°$ in a diffraction diagram obtained by powder X-ray diffraction using a Cu-Kα radiation source, and that a peak intensity ratio ($I_H/I_L$) between these two peaks is less than 1. The peak intensity ratio for the $Nb_2TiO_7$ phase having a composition in which the Nb/Ti ratio is greater than 2 is also referred to as first peak intensity ratio. When the first peak intensity ratio is less than 1, it can be determined that the niobium-titanium composite oxide including the $Nb_2TiO_7$ phase having a composition in which the Nb/Ti ratio is greater than 2 has high crystallinity.

Also, it is preferable that the niobium-titanium composite oxide including at least one kind selected from the group consisting of an $Nb_{10}Ti_2O_{29}$ phase, an $Nb_{14}TiO_{37}$ phase and an $Nb_{24}TiO_{62}$ phase has two peaks appearing at $2\theta=44°\pm1.0°$ in a diffraction diagram obtained by powder X-ray diffraction using a Cu-Kα radiation source, and that a peak intensity ratio ($I_H/I_L$) between these two peaks is less than 1.5. The peak intensity ratio for each of the $Nb_{10}Ti_2O_{29}$ phase, the $Nb_{14}TiO_{37}$ phase, and the $Nb_{24}TiO_{62}$ phase is also referred to as second peak intensity ratio. When the second peak intensity ratio is less than 1.5, it can be determined that the niobium-titanium composite oxide has high crystallinity.

Here, $I_H$ is the peak intensity of a high-angle side peak $P_H$, and $I_L$ is the peak intensity of a low-angle side peak $P_L$. Of the two peaks appearing in a range of $2\theta=44°\pm1.0°$, the low-angle side peak $P_L$ is considered a peak on a (0 0 5) plane, and the peak $P_H$ on the high-angle side is considered a peak on a (–10 0 3) plane. When the first peak intensity ratio ($I_H/I_L$) is less than 1.0, a composite oxide having high lithium ion conductivity and high capacity can be obtained. When the second peak intensity ratio ($I_H/I_L$) is less than 1.5, a composite oxide having high lithium ion conductivity and high capacity can be obtained.

These peak intensity ratios ($I_H/I_L$) can be used as indicators for determining whether a more preferable crystal structure is obtained within the above particle size range in the niobium-titanium composite oxide of the present embodiment having an average composition in which the Nb/Ti ratio is greater than 2, that is, whether the niobium-titanium composite oxide has high crystallinity.

<Powder X-Ray Diffraction Measurement of Electrode Material>

The powder X-ray diffraction measurement of the electrode material can be performed, for example, as follows.

First, the target sample is ground so as to attain the above particle size ranges (D10, D50 and D90). A holder part, which has a depth of 0.2 mm and is formed on a glass sample plate, is filled with the ground sample. At this time, care should be taken to fill the holder part sufficiently with the sample. Also, precaution should be taken to perform filling with an amount of the sample neither being excessive nor insufficient such that cracks, voids, and the like do not occur. Next, another glass plate is pushed from the outside to flatten a surface of the sample having filled the holder part. Precaution should be taken not to cause a recess or a protrusion from a reference plane of the holder due to an excessive or insufficient amount of filling.

Next, the glass plate filled with the sample is set in a powder X-ray diffractometer, and a diffraction pattern (X-Ray diffraction pattern (XRD pattern)) is obtained using Cu-Kα rays.

Incidentally, there is a case where the orientation of the sample increases depending on a particle shape of the sample. In the case where there is high degree of orientation in the sample, there is the possibility of deviation of the peak or variation in an intensity ratio, depending on the filling state of the sample. The sample whose orientation is remarkably high in this manner is measured using a glass capillary. Specifically, a sample is inserted into a capillary, and this capillary is placed on a rotary sample stage and measured. It is possible to alleviate the orientation with the above-described measuring method. It is preferable to use a capillary formed of Lindeman glass having a diameter of 1 mm to 6 mmφ as the glass capillary.

In the powder X-ray diffraction measurement results, an impurity phase such as lithium carbonate or lithium fluoride may be mixed due to the influence of the lithium ions remaining in the electrode. The mixing of an impurity phase can be prevented, for example, by setting the measurement atmosphere to an inert gas atmosphere or washing the electrode surface. Even if an impurity phase is present, it is possible to ignore the phase for analysis.

As an apparatus for powder X-ray diffraction measurement, SmartLab manufactured by Rigaku Corporation, for example, is used. The measurement conditions are as follows:

X-ray source: Cu target
Output: 45 kV 200 mA
Solar slit: 5° for both incident light and received light
Step width (2θ): 0.02 deg
Scan speed: 20 deg/min
Semiconductor detector: D/teX Ultra 250
Measurement range: $5°\leq2\theta\leq90°$
Sample plate holder: flat glass sample plate holder (thickness: 0.5 mm).

When any other apparatus is used, measurement is performed using standard Si powder for powder X-ray diffraction so that the equivalent measurement results as above can be obtained, and the conditions are adjusted so that the peak intensity and peak top position match those of the apparatus. Then, measurement is made.

In the obtained diffraction diagram, of the two peaks appearing in the range of $2\theta=44°\pm1.0°$, the peak intensity $I_H$ of the high-angle side peak and the peak intensity $I_L$ of the low-angle side peak are determined. Then, the ratio of the peak intensity of the high-angle side peak to the peak intensity of the low-angle side peak, that is, the peak intensity ratio ($I_H/I_L$) is calculated.

In addition, the crystallite diameter can be obtained by analyzing the obtained XRD diffraction diagram by the Rietveld method. In the Rietveld method, the diffraction pattern is calculated from a crystal structure model estimated in advance. By fitting all the calculated values and the measured values, the parameters related to the crystal structure (lattice constant, atomic coordinates, occupancy, etc.) can be analyzed precisely. This makes it possible to investigate the characteristics of the crystal structure of the synthesized oxide.

Here, the crystallite diameter is calculated from the Scherrer's equation shown in Equation 1 below:

[Mathematical Formula 1]

$$\text{Crystallite Diameter(nm)} = \frac{K\lambda}{\beta \cos\theta} \quad \beta = \sqrt{\beta_e^2 - \beta_o^2} \quad (2)$$

In Equation (1), K=0.9; λ=0.15406 nm; $\beta_e$: half width of diffraction peak; and $\beta_o$: correction value (0.07°) of half width.

<BET Specific Surface Area>

The BET (Brunauer, Emmett, Teller) specific surface area of the active material according to the embodiment is not particularly limited. However, the BET specific surface area is preferably 5 $m^2/g$ or more and less than 200 $m^2/g$.

If the specific surface area is 5 $m^2/g$ or more, a contact area with the electrolyte can be secured, favorable discharge rate characteristics can be easily obtained, and the charging time can be shortened. If the specific surface area is less than 200 $m^2/g$, on the other hand, reactivity with the electrolyte does not become too high so that the life performance can be improved. Further, coating properties of a slurry used in the production of an electrode described below and including the active material can be made favorable.

Here, for the measurement of the specific surface area, a method is used by which molecules, in which an occupied area in adsorption is known, are adsorbed onto the surface of powder particles at a temperature of liquid nitrogen and the specific surface area of the sample is determined from the amount of adsorbed molecules. The most commonly used is the BET method based on low-temperature and low-humidity physical adsorption of an inert gas, which is the most famous theory as a method of calculating the specific surface area by extending the Langmuir theory, which is monomolecular layer adsorption theory to multimolecular layer adsorption. The specific surface area determined by the above method is referred to as a "BET specific surface area".

<Method for Confirming Composition of Composite Oxide>

The average composition of the niobium-titanium composite oxide and the concentration of the element A can be analyzed using, for example, inductively coupled plasma (ICP) emission spectrometry.

<Confirmation of Solid Solution State of Composite Oxide>

The presence state of the element A and the solid solution states of the elements M1 and M2, in the niobium-titanium composite oxide, can be confirmed by transmission electron microscope (TEM)-energy dispersive X-ray spectroscopy (EDX). In addition, by scanning electron microscope (SEM)-energy dispersive X-ray spectroscopy (EDX), the presence concentrations of the element A inside the niobium-titanium composite oxide particle and at the particle interface can be confirmed from element mapping analysis on the electrode cross section.

<Measurement of Electrode Material Contained in Electrode>

When the above powder X-ray diffraction measurement, ICP measurement, TEM-EDX measurement, specific surface area measurement by a BET method and grain size distribution measurement by the laser diffraction/scattering method are performed on the electrode material (active material) contained in the electrode, the target sample can be prepared as follows, for example.

First, in order to grasp the crystal state of the active material, lithium ions are completely extracted from the niobium-titanium composite oxide. For example, when a negative electrode active material is defined as a measurement target, the battery is completely discharged. However, the negative electrode active material may contain remaining lithium ions even in the completely discharged state.

The battery is then disassembled in an argon-filled glove box, and the electrode is taken out and washed with a suitable solvent. As the suitable solvent, for example, ethyl methyl carbonate can be used.

In the case of the powder X-ray diffraction measurement, the electrode washed as described above can be cut out to approximately the same area as that of a holder of a powder X-ray diffractometer and used as the measurement sample. This sample is directly pasted onto the glass holder for measurement.

At this time, the peak corresponding to a metal of a metal foil contained in the electrode is measured in advance using XRD to grasp the peak position derived from an electrode substrate. Further, the peak positions of other components such as a conductive auxiliary agent and a binder are also measured in advance by the same method and grasped. When the peak of the substrate material and the peak of the active material overlap, it is desirable to peel the active material from the substrate for measurement. This is to separate overlapping peaks when quantitatively measuring the peak intensity. Of course, this operation can be omitted if these can be grasped in advance.

In the measurement, the electrode layer may be physically peeled off from the current collector. When ultrasonic waves are applied in a solvent, the electrode layer is easily peeled off from the current collector. An electrode powder sample can be prepared from the electrode layer thus peeled off, or only the active material particles can be separated, so that the sample or the active material particles can be subjected to the above various measurements.

<Method for Producing Electrode Material>

The electrode material according to the embodiment can be produced by a synthesis method which will be described below.

(Synthesis Method)

The niobium-titanium composite oxide having an average composition in which the molar ratio of niobium to titanium (Nb/Ti) is greater than 2 can be synthesized as follows. First, starting materials are mixed. As a starting material containing niobium and titanium, an oxide or salt containing Nb and Ti is prepared. As a starting material containing the element M1, an oxide or salt containing at least one element selected from the group consisting of Ta, Ti, V, Mo and W is prepared. As a starting material containing the element M2, an oxide or salt containing at least one element selected from the group consisting of Nb, Ta, Zr, Hf and Sn is prepared. The salts used as the starting materials are preferably salts, such as a carbonate and a nitrate, which decompose at a relatively low temperature to form oxides.

These starting materials are mixed at a molar ratio such that the desired composition is obtained. The resulting mixture is then ground to give as uniform a mixture as possible. Then, the obtained mixture is subjected to pre-firing (first firing). The pre-firing (first firing), which is divided into two or more portions, is performed within a temperature range of 500 to 900° C. for a total of 10 to 40 hours. As a result, precursor particles with high uniformity can be obtained.

Next, as a supply source for the element A, an oxide or salt containing at least one element A selected from the group consisting of potassium, iron and phosphorus is prepared. To the precursor particles obtained above, the oxide or salt containing the element A is added so that the concentration is in the range of 100 ppm to 2000 ppm, and wet mixing is performed. At this time, it is preferable to wet-mix with a raw material soluble in a solvent such as water as the supply source containing the element A because the element A can be uniformly distributed onto the surface of the precursor particles.

Next, the mixture of the precursor particles and the element A obtained by wet mixing is subjected to main firing (second firing). The main firing is preferably performed at a temperature of 800° C. to 1450° C. for 1 hour to 10 hours. The main firing is more preferably performed at a temperature of 1000° C. to 1450° C. for 2.5 hours to 3.5 hours. The firing at a high temperature for a short time in this way can increase the concentration of the element A on the surface of the particles. The powder thus obtained is mildly ground in as short a time as possible without applying a strong share as much as possible. For this grinding, for example, a roller compactor, a bead mill apparatus, a ball mill apparatus, or the like can be used.

By changing the grinding conditions, D10, D50 and D90 of the electrode material obtained can be controlled. For example, there is a tendency that D10, D50 and D90 can be reduced by increasing the grinding time. Also, for example, there is a tendency that D10, D50 and D90 can be reduced by using a grinding medium having a smaller diameter. Alternatively, the powder is subjected to centrifugation, thereby making it possible to collect particles having a small D10 or particles having a large D90. For example, D10, D50 and D90 can be controlled by mixing the collected particles with a separately synthesized electrode material.

After grinding, annealing treatment may be performed. The temperature of the annealing treatment is desirably 350° C. or higher and 800° C. or lower. The annealing treatment performed in this temperature range can mitigate the strain in the crystal and stabilize the crystal state after grinding. That is, the crystallite diameter can be increased by the annealing treatment. This annealing treatment is used in combination with the synthesis scheme in which the element A is added, followed by main firing and grinding in a short time, and thus can provide active material particles having a larger crystallite diameter more effectively than the conventional annealing treatment.

As described above, when producing the niobium-titanium composite oxide having an average composition in which the Nb/Ti ratio is greater than 2, the element A is added, followed by main firing and mild grinding, thereby making it possible to produce an electrode material having high crystallinity and a low proportion of fine powder. For example, in the diffraction diagram obtained by powder X-ray diffraction on the electrode material thus obtained, when the electrode material includes an $Nb_2TiO_7$ phase having a composition in which the Nb/Ti ratio is greater than 2, the first peak intensity ratio described above can be less than 1. Further, when the electrode material includes at least one kind of an $Nb_{10}Ti_2O_{29}$ phase, an $Nb_{14}TiO_{37}$ phase and an $Nb_{24}TiO_{62}$ phase, the second peak intensity ratio described above can be less than 1.5.

In the niobium-titanium composite oxide synthesized by the above method, lithium ions may be inserted by charging the battery after assembling of the battery. Alternatively, it may be synthesized as a lithium-containing composite oxide by using a lithium-containing compound such as lithium carbonate as the starting material.

According to a first embodiment, an electrode material is provided. The electrode material includes active material particle containing: a niobium-titanium composite oxide having an average composition in which a molar ratio of niobium to titanium ($M_{Nb}/M_{Ti}$) is greater than 2; and at least one element A selected from the group consisting of potassium, iron and phosphorus. The active material particle contain the element A at a concentration in the range of 100 ppm to 2000 ppm. This electrode material includes active material particle having high crystallinity and a stable basic skeleton, has a low proportion of fine powder, and thus can exhibit excellent rapid charge-discharge characteristics and cycle life characteristics.

Second Embodiment

According to a second embodiment, an electrode is provided.

The electrode according to the second embodiment includes the electrode material according to the first embodiment. The electrode according to the embodiment may be a negative electrode or a positive electrode. The electrode according to the embodiment is, for example, an electrode for a battery, an electrode for a secondary battery, or an electrode for a lithium secondary battery. The electrode can be a negative electrode containing the electrode material according to the first embodiment as a negative electrode material.

The electrode according to the second embodiment may include a current collector and an active material-containing layer. The active material-containing layer may be formed on both of reverse surfaces or one surface of the current collector. The active material-containing layer may contain the active material, and optionally an electro-conductive agent and a binder.

The active material-containing layer may singly include the electrode material according to the first embodiment or include two or more kinds of the electrode material according to the first embodiment. Furthermore, a mixture where one kind or two or more kinds of the electrode material according to the first embodiment is further mixed with one kind or two or more kinds of another active material may also be included.

For example, in the case of a negative electrode containing the electrode material according to the first embodiment as the negative electrode material, this negative electrode can contain an active material other than the niobium-titanium composite oxide having an average composition in which the Nb/Ti ratio is greater than 2.

Examples of such an active material include lithium titanate having a ramsdellite structure (e.g., $Li_{2+y}Ti_3O_7$, $0 \leq y \leq 3$) and lithium titanate having a spinel structure (e.g., $Li_{4+x}Ti_5O_{12}$, $0 \le x \le 3$), monoclinic titanium dioxide ($TiO_2$), anatase type titanium dioxide, rutile type titanium dioxide, hollandite type titanium composite oxide, and orthorhombic titanium dioxide-containing composite oxide. Further, the electrode material may contain a niobium-titanium composite oxide having an Nb/Ti ratio of 2 as such an active material. A proportion of the niobium-titanium composite oxide having an average composition in which the Nb/Ti ratio is greater than 2 in the active material particles contained in the electrode material is, for example, 50% by mass or more.

Examples of the orthorhombic titanium-containing composite oxide include a compound represented by $Li_{2+a}M(I)_{2-b}Ti_{6-c}M(II)_dO_{14+\sigma}$. Here, M(I) is at least one selected from the group consisting of Sr, Ba, Ca, Mg, Na, Cs, Rb and K. M(II) is at least one selected from the group consisting of Zr, Sn, V, Nb, Ta, Mo, W, Y, Fe, Co, Cr, Mn, Ni and Al. The respective subscripts in the composition formula are specified as follows: $0 \le a \le 6$, $0 \le b < 2$, $0 \le c < 6$, $0 \le d < 6$, and $-0.5 \le \sigma \le 0.5$. Specific examples of the orthorhombic titanium-containing composite oxide include $Li_{2+a}Na_2Ti_6O_{14}$ ($0 \le a \le 6$).

The electro-conductive agent is added to improve current collection performance and to suppress the contact resistance between the active material and the current collector. Examples of the electro-conductive agent include carbonaceous substances such as vapor grown carbon fiber (VGCF), carbon blacks such as acetylene black, and graphite. One of these may be used as the electro-conductive agent, or two or more may be used in combination as the electro-conductive agent. Alternatively, instead of using an electro-conductive agent, a carbon coating or an electro-conductive inorganic material coating may be applied to the surface of the active material particle.

The binder is added to fill gaps among the dispersed active material and also to bind the active material with the current collector. Examples of the binder include polytetrafluoroethylene (PTFE), polyvinylidene fluoride (PVdF), fluorine rubber, styrene-butadiene rubber, polyacrylate compounds, imide compounds, carboxymethyl cellulose (CMC), and salts of CMC. One of these may be used as the binder, or two or more may be used in combination as the binder.

The blending proportion of electrode material, electro-conductive agent and binder in the active material-containing layer may be appropriately changed according to the use of the electrode. For example, in the case of using the electrode as a negative electrode of a secondary battery, the electrode material, electro-conductive agent and binder in the active material-containing layer are preferably blended in proportions of 68% by mass to 96% by mass, 2% by mass to 30% by mass, and 2% by mass to 30% by mass, respectively. When the amount of electro-conductive agent is 2% by mass or more, the current collection performance of the active material-containing layer can be improved. When the amount of binder is 2% by mass or more, binding between the active material-containing layer and current collector is sufficient, and excellent cycling performances can be expected. On the other hand, an amount of each of the electro-conductive agent and binder is preferably 30% by mass or less, in view of increasing the capacity.

There may be used for the current collector, a material which is electrochemically stable at the potential (vs. $Li/Li^+$) at which lithium (Li) is inserted into and extracted from active material. For example in the case where the electrode material is used as a negative electrode material, the current collector is preferably made of copper, nickel, stainless steel, aluminum, or an aluminum alloy including one or more elements selected from the group consisting of Mg, Ti, Zn, Mn, Fe, Cu, and Si. The thickness of the current collector is preferably from 5 µm to 20 µm. The current collector having such a thickness can maintain balance between the strength and weight reduction of the electrode.

The current collector may include a portion where the active material-containing layer is not formed on a surface of the current collector. This portion may serve as an electrode tab.

The electrode may be produced by the following method, for example. First, electrode material according to the embodiment, electro-conductive agent, and binder are suspended in a solvent to prepare a slurry. The slurry is applied onto one surface or both of reverse surfaces of a current collector. Next, the applied slurry is dried to form a layered stack of active material-containing layer and current collector. Then, the layered stack is subjected to pressing. The electrode can be produced in this manner.

Alternatively, the electrode may also be produced by the following method. First, electrode material, electro-conductive agent, and binder are mixed to obtain a mixture. Next, the mixture is formed into pellets. Then the electrode can be obtained by arranging the pellets on the current collector.

The electrode according to the second embodiment includes the electrode material according to the first embodiment. Therefore, the electrode can realize a secondary battery capable of exhibiting excellent rapid charge-discharge characteristics and cycle life characteristics.

Third Embodiment

According to a third embodiment, there is provided a secondary battery including a negative electrode, a positive electrode, and an electrolyte. The secondary battery includes the electrode according to the second embodiment as the negative electrode. That is, the secondary battery according to the third embodiment includes, as the negative electrode, the electrode containing the electrode material according to the first embodiment.

The secondary battery according to the embodiment may further include a separator provided between the positive electrode and the negative electrode. The negative electrode, the positive electrode, and the separator can structure an electrode group. The electrolyte may be held in the electrode group.

The secondary battery may further include a container member that houses the electrode group and the electrolyte.

Further, the secondary battery may further include a negative electrode terminal electrically connected to the negative electrode and a positive electrode terminal electrically connected to the positive electrode.

The secondary battery may be, for example, a lithium ion secondary battery. The secondary battery also includes nonaqueous electrolyte secondary batteries containing nonaqueous electrolyte(s).

Hereinafter, the negative electrode, the positive electrode, the electrolyte, the separator, the container member, the negative electrode terminal, and the positive electrode terminal will be described in detail.

(1) Negative Electrode

The negative electrode may include a negative electrode current collector and a negative electrode active material-containing layer. The negative electrode current collector and the negative electrode active material-containing layer may be respectively a current collector and an active material-containing layer that may be included in the electrode according to the second embodiment. The negative electrode active material-containing layer contains the electrode material according to the first embodiment as a negative electrode active material.

Of the details of the negative electrode, parts overlapping with the details described in the second embodiment are omitted.

The density of the negative electrode active material-containing layer (excluding the current collector), that is, the electrode density is preferably from 1.8 g/cm$^3$ to 3.5 g/cm$^3$. The negative electrode, in which the density of the negative electrode active material-containing layer is within this range, is excellent in energy density and ability to hold the electrolyte. The density of the negative electrode active material-containing layer is more preferably from 2.5 g/cm$^3$ to 2.9 g/cm$^3$.

The negative electrode may be produced by a method similar to that for the electrode according to the second embodiment, for example.

(2) Positive Electrode

The positive electrode may include a positive electrode current collector and a positive electrode active material-containing layer. The positive electrode active material-containing layer may be formed on one surface or both of reverse surfaces of the positive electrode current collector. The positive electrode active material-containing layer may include a positive electrode active material, and optionally an electro-conductive agent and a As the positive electrode active material, for As the positive electrode active material, for example, an oxide or a sulfide may be used. The positive electrode may singly include one kind of compound as the positive electrode active material, or include two or more kinds of compounds in combination. Examples of the oxide and sulfide include compounds capable of having Li and Li ions be inserted and extracted.

Examples of such compounds include manganese dioxides (MnO$_2$), iron oxides, copper oxides, nickel oxides, lithium manganese composite oxides (e.g., Li$_x$Mn$_2$O$_4$ or Li$_x$MnO$_2$; 0<x≤1), lithium nickel composite oxides (e.g., Li$_x$NiO$_2$; 0<x≤1), lithium cobalt composite oxides (e.g., Li$_x$CoO$_2$; 0<x≤1), lithium nickel cobalt composite oxides (e.g., Li$_x$Ni$_{1-y}$Co$_y$O$_2$; 0<x≤1, 0<y<1), lithium manganese cobalt composite oxides (e.g., Li$_x$Mn$_y$Co$_{1-y}$O$_2$; 0<x≤1, 0<y<1), lithium manganese nickel composite oxides having a spinel structure (e.g., Li$_x$Mn$_{2-y}$Ni$_y$O$_4$; 0<x≤1, 0<y<2), lithium phosphates having an olivine structure (e.g., Li$_x$FePO$_4$; 0<x≤1, Li$_x$Fe$_{1-y}$Mn$_y$PO$_4$; 0<x≤1, 0<y<1, and Li$_x$CoPO$_4$; 0<x≤1), iron sulfates [Fe$_2$(SO$_4$)$_3$], vanadium oxides (e.g., V$_2$O$_5$), and lithium nickel cobalt manganese composite oxides (Li$_x$Ni$_{1-y-z}$Co$_y$Mn$_z$O$_2$; 0<x≤1, 0<y<1, 0<z<1, y+z<1).

Among the above, examples of compounds more preferable as the positive electrode active material include lithium manganese composite oxides having a spinel structure (e.g., Li$_x$Mn$_2$O$_4$; 0<x≤1), lithium nickel composite oxides (e.g., Li$_x$NiO$_2$; 0<x≤1), lithium cobalt composite oxides (e.g., Li$_x$CoO$_2$; 0<x≤1), lithium nickel cobalt composite oxides (e.g., Li$_x$Ni$_{1-y}$Co$_y$O$_2$; 0<x≤1, 0<y<1), lithium manganese nickel composite oxides having a spinel structure (e.g., Li$_x$Mn$_{2-y}$Ni$_y$O$_4$; 0<x≤1, 0<y<2), lithium manganese cobalt composite oxides (e.g., Li$_x$Mn$_y$Co$_{1-y}$O$_2$; 0<x≤1, 0<y<1), lithium iron phosphates (e.g., Li$_x$FePO$_4$; 0<x≤1), and lithium nickel cobalt manganese composite oxides (Li$_x$Ni$_{1-y-z}$Co$_y$Mn$_z$O$_2$; 0<x≤1, 0<y<1, 0<z<1, y+z<1). The positive electrode potential can be made high by using these positive electrode active materials.

When a room temperature molten salt is used as the electrolyte of the battery, it is preferable to use a positive electrode active material including lithium iron phosphate, Li$_x$VPO$_4$F (0≤x≤1), lithium manganese composite oxide, lithium nickel composite oxide, lithium nickel cobalt composite oxide, or a mixture thereof. Since these compounds have low reactivity with room temperature molten salts, cycle life can be improved. Details regarding the room temperature molten salt are described later.

The primary particle size of the positive electrode active material is preferably from 100 nm to 1 μm. The positive electrode active material having a primary particle size of 100 nm or more is easy to handle during industrial production. In the positive electrode active material having a primary particle size of 1 μm or less, diffusion of lithium ions within solid can proceed smoothly.

The specific surface area of the positive electrode active material is preferably from 0.1 m$^2$/g to 10 m$^2$/g. The positive electrode active material having a specific surface area of 0.1 m$^2$/g or more can secure sufficient sites for inserting and extracting Li ions. The positive electrode active material having a specific surface area of 10 m$^2$/g or less is easy to handle during industrial production, and can secure a good charge and discharge cycle performance.

The binder is added to fill gaps among the dispersed positive electrode active material and also to bind the positive electrode active material with the positive electrode current collector. Examples of the binder include polytetrafluoroethylene (PTFE), polyvinylidene fluoride (PVdF), fluorine rubber, polyacrylate compounds, imide compounds, carboxymethyl cellulose (CMC), and salts of CMC. One of these may be used as the binder, or two or more may be used in combination as the binder.

The electro-conductive agent is added to improve current collection performance and to suppress the contact resistance between the positive electrode active material and the positive electrode current collector. Examples of the electro-conductive agent include carbonaceous substances such as vapor grown carbon fiber (VGCF), carbon black such as acetylene black, and graphite. One of these may be used as the electro-conductive agent, or two or more may be used in combination as the electro-conductive agent. The electro-conductive agent may be omitted.

In the positive electrode active material-containing layer, the positive electrode active material and binder are preferably blended in proportions of 80% by mass to 98% by mass, and 2% by mass to 20% by mass, respectively.

When the amount of the binder is 2% by mass or more, sufficient electrode strength can be achieved. The binder may serve as an electrical insulator. Thus, when the amount of the binder is 20% by mass or less, the amount of insulator in the electrode is reduced, and thereby the internal resistance can be decreased.

When an electro-conductive agent is added, the positive electrode active material, binder, and electro-conductive agent are preferably blended in proportions of 77% by mass to 95% by mass, 2% by mass to 20% by mass, and 3% by mass to 15% by mass, respectively.

When the amount of the electro-conductive agent is 3% by mass or more, the above-described effects can be expressed. By setting the amount of the electro-conductive agent to 15% by mass or less, the proportion of electro-conductive agent that contacts the electrolyte can be made low. When this proportion is low, the decomposition of an electrolyte can be reduced during storage under high temperatures.

The positive electrode current collector is preferably an aluminum foil, or an aluminum alloy foil containing one or more elements selected from the group consisting of Mg, Ti, Zn, Ni, Cr, Mn, Fe, Cu, and Si.

The thickness of the aluminum foil or aluminum alloy foil is preferably from 5 μm to 20 μm, and more preferably 15 μm or less. The purity of the aluminum foil is preferably 99% by mass or more. The amount of transition metal such as iron, copper, nickel, or chromium contained in the aluminum foil or aluminum alloy foil is preferably 1% by mass or less.

The positive electrode current collector may include a portion where a positive electrode active material-containing layer is not formed on a surface of the positive electrode current collector. This portion may serve as a positive electrode tab.

The positive electrode may be produced by a method similar to that for the electrode according to the second embodiment, for example, using a positive electrode active material.

(3) Electrolyte

As the electrolyte, for example, a liquid nonaqueous electrolyte or gel nonaqueous electrolyte may be used. The liquid nonaqueous electrolyte is prepared by dissolving an electrolyte salt as solute in an organic solvent. The concentration of electrolyte salt is preferably from 0.5 mol/L to 2.5 mol/L.

Examples of the electrolyte salt include lithium salts such as lithium perchlorate ($LiClO_4$), lithium hexafluorophosphate ($LiPF_6$), lithium tetrafluoroborate ($LiBF_4$), lithium hexafluoroarsenate ($LiAsF_6$), lithium trifluoromethanesulfonate ($LiCF_3SO_3$), and lithium bistrifluoromethylsulfonylimide [$LiN(CF_3SO_2)_2$], and mixtures thereof. The electrolyte salt is preferably resistant to oxidation even at a high potential, and most preferably $LiPF_6$.

Examples of the organic solvent include cyclic carbonates such as propylene carbonate (PC), ethylene carbonate (EC), or vinylene carbonate (VC); linear carbonates such as diethyl carbonate (DEC), dimethyl carbonate (DMC), or methyl ethyl carbonate (MEC); cyclic ethers such as tetrahydrofuran (THF), 2-methyl tetrahydrofuran (2-MeTHF), or dioxolane (DOX); linear ethers such as dimethoxy ethane (DME) or diethoxy ethane (DEE); γ-butyrolactone (GBL), acetonitrile (AlN), and sulfolane (SL). These organic solvents may be used singularly or as a mixed solvent.

The gel nonaqueous electrolyte is prepared by obtaining a composite of a liquid nonaqueous electrolyte and a polymeric material. Examples of the polymeric material include polyvinylidene fluoride (PVdF), polyacrylonitrile (PAN), polyethylene oxide (PEO), and mixtures thereof.

Alternatively, other than the liquid nonaqueous electrolyte and gel nonaqueous electrolyte, a room temperature molten salt (ionic melt) including lithium ions, a polymer solid electrolyte, an inorganic solid electrolyte, or the like may be used as the nonaqueous electrolyte.

The room temperature molten salt (ionic melt) indicates compounds among organic salts made of combinations of organic cations and anions, which are able to exist in a liquid state at room temperature (15° C. to 25° C.). The room temperature molten salt includes a room temperature molten salt which exists alone as a liquid, a room temperature molten salt which becomes a liquid upon mixing with an electrolyte salt, a room temperature molten salt which becomes a liquid when dissolved in an organic solvent, and mixtures thereof. In general, the melting point of the room temperature molten salt used in secondary batteries is 25° C. or below. The organic cations generally have a quaternary ammonium framework.

The polymer solid electrolyte is prepared by dissolving the electrolyte salt in a polymeric material, and solidifying it.

The inorganic solid electrolyte is a solid substance having Li ion conductivity.

The electrolyte may also be an aqueous electrolyte containing water.

The aqueous electrolyte includes an aqueous solvent and an electrolyte salt. The aqueous electrolyte is liquid, for example. A liquid aqueous electrolyte is an aqueous solution prepared by dissolving an electrolyte salt as the solute in an aqueous solvent. The aqueous solvent is a solvent containing 50% or more water by volume, for example. The aqueous solvent may also be pure water.

The aqueous electrolyte may also be an aqueous gel composite electrolyte containing an aqueous electrolytic solution and a polymer material. The polymer material may be, for example, polyvinylidene fluoride (PVDF), polyacrylonitrile (PAN), or polyethylene oxide (PEO).

The aqueous electrolyte preferably contains 1 mol or greater of aqueous solvent per 1 mol of the salt as the solute. In an even more preferably aspect, the aqueous electrolyte contains 3.5 mol or greater of aqueous solvent per 1 mol of the salt as the solute.

That the aqueous electrolyte contains water can be confirmed by gas chromatography-mass spectrometry (CC-MS) measurement. Also, the salt concentration and the amount of water contained in the aqueous electrolyte can be computed by measurement using inductively coupled plasma (ICP) emission spectroscopy or the like, for example. By measuring out a prescribed amount of the aqueous electrolyte and computing the contained salt concentration, the molar concentration (mol/L) can be computed. Also, by measuring the specific gravity of the aqueous electrolyte, the number of moles of the solute and the solvent can be computed.

The aqueous electrolyte is prepared by dissolving the electrolyte salt into the aqueous solvent at a concentration from 1 to 12 mol/L for example.

To suppress electrolysis of the aqueous electrolyte, LiOH, $Li_2SO_4$, or the like can be added to adjust the pH. The pH is preferably from 3 to 13, and more preferably from 4 to 12.

(4) Separator

The separator is formed of, for example, a porous film containing polyethylene (polyethylene; PE), polypropylene (polypropylene; PP), cellulose, or polyvinylidene fluoride (PVdF), or a synthetic resin nonwoven fabric. From the viewpoint of safety, it is preferable to use a porous film formed from polyethylene or polypropylene. This is because these porous films can be melted at a predetermined temperature to interrupt the current.

As a separator, a solid electrolyte layer containing solid electrolyte particles can also be used. The solid electrolyte layer may contain one kind of solid electrolyte particles, or may contain a plurality of kinds of solid electrolyte particles. The solid electrolyte layer may be a solid electrolyte composite film containing solid electrolyte particles. The solid electrolyte composite film is, for example, formed by molding solid electrolyte particles into a film shape using a polymer material. The solid electrolyte layer may contain at least one selected from the group consisting of plasticizers and electrolyte salts. When the solid electrolyte layer contains an electrolyte salt, for example, the alkali metal ion conductivity of the solid electrolyte layer can be further enhanced.

Examples of the polymer material include polyether-based, polyester-based, polyamine-based, polyethylene-based, silicone-based and polysulfide-based polymer materials.

As the solid electrolyte, it is preferable to use an inorganic solid electrolyte. Examples of the inorganic solid electrolyte include an oxide-based solid electrolyte and a sulfide-based solid electrolyte. As the oxide-based solid electrolyte, it is preferable to use a lithium phosphate solid electrolyte having a NASICON type structure and represented by the general formula $LiM_2(PO_4)_3$. M in the above general formula is preferably at least one kind of element selected from the group consisting of titanium (Ti), germanium (Ge), strontium (Sr), zirconium (Zr), tin (Sn), and aluminum (Al). It is more preferable that the element M contain any one element of Ge, Zr and Ti, and Al.

Specific examples of the lithium phosphate solid electrolyte having a NASICON type structure can include LATP ($Li_{1+x}Al_xTi_{2-x}(PO_4)_3$), $Li_{1+x}Al_xGe_{2-x}(PO_4)_3$, and $Li_{1-x}Al_xZr_{2-x}(PO_4)_3$. In the above formulae, x is in the range of $0<x\leq5$, preferably in the range of $0.1\leq x\leq0.5$. It is preferable to use LATP as the solid electrolyte. LATP has excellent water resistance and is less likely to cause hydrolysis in a secondary battery.

Further, as the oxide-based solid electrolyte, amorphous LIPON ($Li_{2.9}PO_{3.3}N_{0.46}$) or LLZ ($Li_7La_3Zr_2O_{12}$) having a garnet-type structure may be used.

(5) Container Member

As the container member, for example, a container made of laminate film or a container made of metal may be used.

The thickness of the laminate film is, for example, 0.5 mm or less, and preferably 0.2 mm or less.

As the laminate film, used is a multilayer film including multiple resin layers and a metal layer sandwiched between the resin layers. The resin layer may include, for example, a polymeric material such as polypropylene (PP), polyethylene (PE), nylon, or polyethylene terephthalate (PET). The metal layer is preferably made of aluminum foil or an aluminum alloy foil, so as to reduce weight. The laminate film may be formed into the shape of a container member, by heat-sealing.

The wall thickness of the metal container is, for example, 1 mm or less, more preferably 0.5 mm or less, and still more preferably 0.2 mm or less.

The metal case is made, for example, of aluminum or an aluminum alloy. The aluminum alloy preferably contains elements such as magnesium, zinc, or silicon. If the aluminum alloy contains a transition metal such as iron, copper, nickel, or chromium, the content thereof is preferably 100 ppm by mass or less.

The shape of the container member is not particularly limited. The shape of the container member may be, for example, flat (thin), square, cylinder, coin, or button-shaped. The container member may be appropriately selected depending on battery size and use of the battery.

(6) Negative electrode Terminal

The negative electrode terminal may be made of a material that is electrochemically stable at the potential at which Li is inserted into and extracted from the above-described negative electrode active material, and has electrical conductivity. Specific examples of the material for the negative electrode terminal include copper, nickel, stainless steel, aluminum, and aluminum alloy containing at least one element selected from the group consisting of Mg, Ti, Zn, Mn, Fe, Cu, and Si. Aluminum or aluminum alloy is preferred as the material for the negative electrode terminal. The negative electrode terminal is preferably made of the same material as the negative electrode current collector, in order to reduce the contact resistance with the negative electrode current collector.

(7) Positive Electrode Terminal

The positive electrode terminal may be made of, for example, a material that is electrically stable in the potential range of 3 V to 5 V (vs. $Li/Li^+$) relative to the redox potential of lithium, and has electrical conductivity. Examples of the material for the positive electrode terminal include aluminum and an aluminum alloy containing one or more selected from the group consisting of Mg, Ti, Zn, Mn, Fe, Cu, and Si. The positive electrode terminal is preferably made of the same material as the positive electrode current collector, in order to reduce contact resistance with the positive electrode current collector.

Next, the secondary battery according to the third embodiment will be more specifically described with reference to the drawings.

Figure 3:
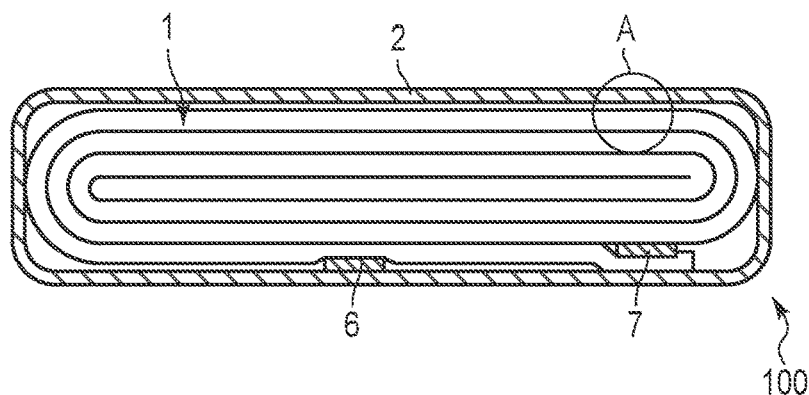
FIG. 3 is a cross-sectional view schematically illustrating an example of a secondary battery according to an embodiment.
Figure 4:
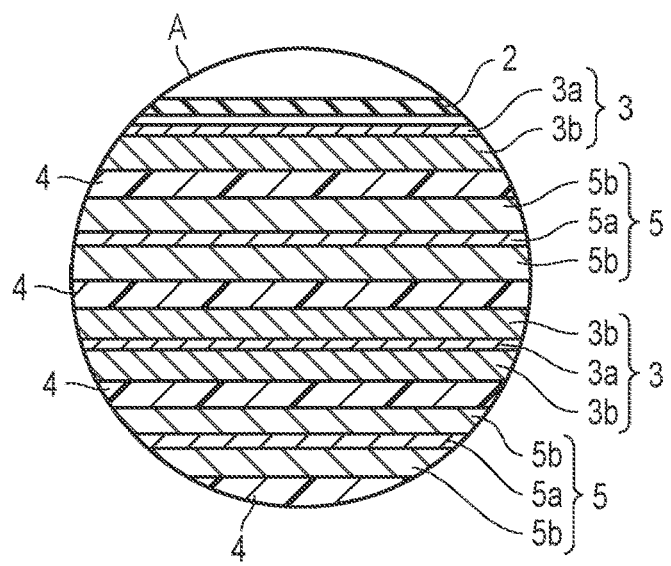
FIG. 4 is an enlarged cross-sectional view of a section A of the secondary battery illustrated in FIG. 3.

FIG. 3 is a cross-sectional view schematically showing an example of a secondary battery according to the third embodiment. FIG. 4 is an enlarged cross-sectional view of section A of the secondary battery shown in FIG. 3.

The secondary battery 100 shown in FIGS. 3 and 4 includes a bag-shaped container member 2 shown in FIGS. 3 and 54 an electrode group 1 shown in FIG. 3, and an electrolyte, which is not shown. The electrode group 1 and the electrolyte are housed in the bag-shaped container member 2. The electrolyte (not shown) is held in the electrode group 1.

The bag-shaped container member 2 is made of a laminate film including two resin layers and a metal layer sandwiched between the resin layers.

As shown in FIG. 3, the electrode group 1 is a wound electrode group in a flat form. The wound electrode group 1 in a flat form includes a negative electrode 3, a separator 4, and a positive electrode 5, as shown in FIG. 4. The separator 4 is sandwiched between the negative electrode 3 and the positive electrode 5.

The negative electrode 3 includes a negative electrode current collector 3a and a negative electrode active material-containing layer 3b. At the portion of the negative electrode 3 positioned outermost among the wound electrode group 1, the negative electrode active material-containing layer 3b is formed only on an inner surface of the negative electrode current collector 3a, as shown in FIG. 4. For the other portions of the negative electrode 3, negative electrode active material-containing layers 3b are formed on both of reverse surfaces of the negative electrode current collector 3a.

The positive electrode 5 includes a positive electrode current collector 5a and positive electrode active material-containing layers 5b formed on both of reverse surfaces of the positive electrode current collector 5a.

As shown in FIG. 3, a negative electrode terminal 6 and positive electrode terminal 7 are positioned in vicinity of the outer peripheral edge of the wound electrode group 1. The negative electrode terminal 6 is connected to a portion of the negative electrode current collector 3a positioned outermost. The positive electrode terminal 7 is connected to a portion of the positive electrode current collector 5a positioned outermost. The negative electrode terminal 6 and the positive electrode terminal 7 extend out from an opening of the bag-shaped container member 2. A thermoplastic resin layer is provided on the inner surface of the bag-shaped container member 2, and the opening is sealed by heat-sealing the resin layer.

Figure 5:
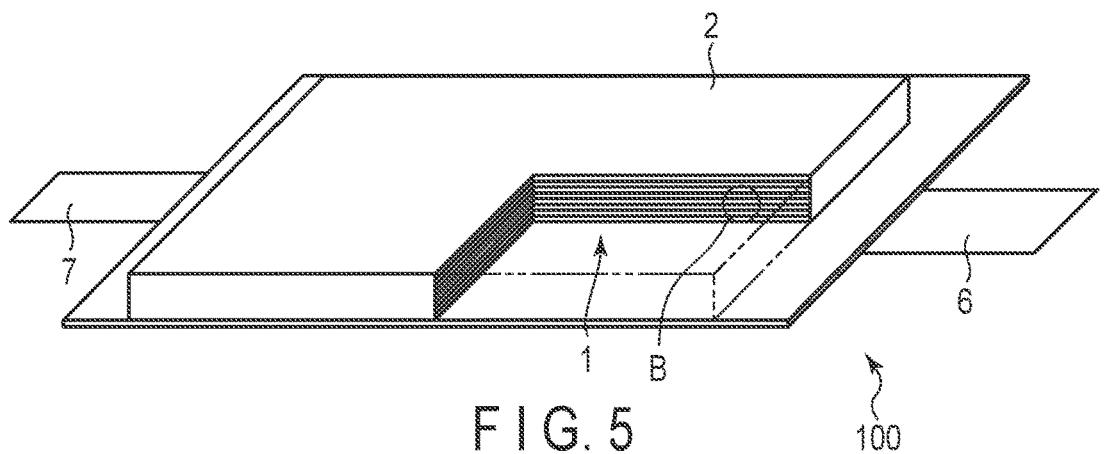
FIG. 5 is a partially cut-out perspective view schematically illustrating another example of the secondary battery according to the embodiment.
Figure 6:
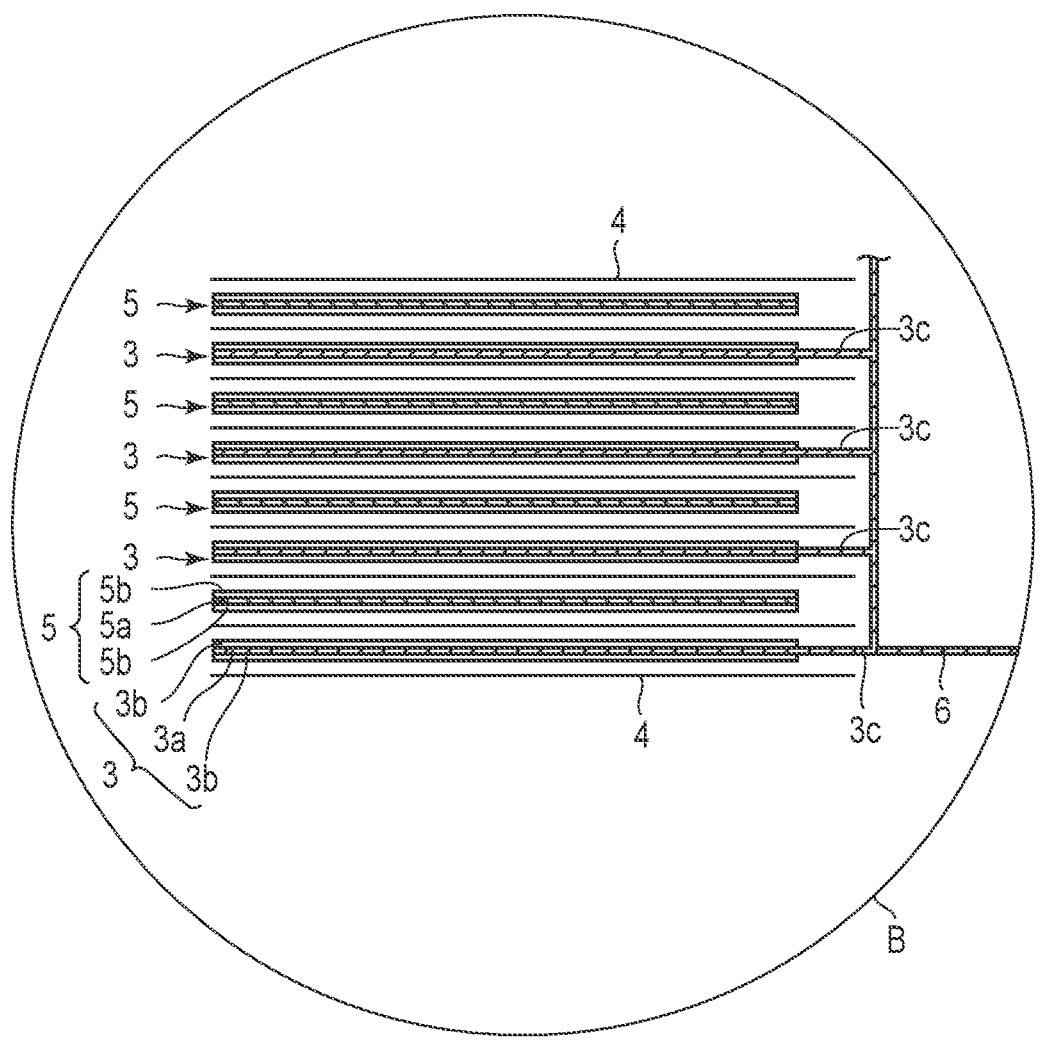
FIG. 6 is an enlarged cross-sectional view of a section B of the secondary battery illustrated in FIG. 5.

The secondary battery according to the third embodiment is not limited to the secondary battery of the structure shown in FIGS. 3 and 4, and may be, for example, a battery of a structure as shown in FIGS. 5 and 6.

FIG. 5 is a partially cut-out perspective view schematically showing another example of a secondary battery according to the third embodiment. FIG. 6 is an enlarged cross-sectional view of section B of the secondary battery shown in FIG. 5.

The secondary battery 100 shown in FIGS. 5 and 6 includes an electrode group 1 shown in FIGS. 5 and 6, a container member 2 shown in FIG. 5, and an electrolyte, which is not shown. The electrode group 1 and the electrolyte are housed in the container member 2. The electrolyte is held in the electrode group 1.

The container member 2 is made of a laminate film including two resin layers and a metal layer sandwiched between the resin layers.

As shown in FIG. 6, the electrode group 1 is a stacked electrode group. The stacked electrode group 1 has a structure in which and negative electrodes 3 and positive electrodes 5 are alternately stacked with separator(s) 4 sandwiched therebetween.

The electrode group 1 includes plural negative electrodes 3. Each of the negative electrodes 3 includes the negative electrode current collector 3a and the negative electrode active material-containing layers 3b supported on both surfaces of the negative electrode current collector 3a. The electrode group 1 further includes plural positive electrodes 5. Each of the positive electrodes 5 includes the positive electrode current collector 5a and the positive electrode active material-containing layers 5b supported on both surfaces of the positive electrode current collector 5a.

The negative electrode current collector 3a of each of the negative electrodes 3 includes at one end, a portion 3c where the negative electrode active material-containing layer 3b is not supported on either surface. This portion 3c serves as a negative electrode tab. As shown in FIG. 6, the portions 3c serving as the negative electrode tabs do not overlap the positive electrodes 5. The plural negative electrode tabs (portions 3c) are electrically connected to the strip-shaped negative electrode terminal 6. A tip of the strip-shaped negative electrode terminal 6 is drawn to the outside from the container member 2.

Although not shown, the positive electrode current collector 5a of each of the positive electrodes 5 includes at one end, a portion where the positive electrode active material-containing layer 5b is not supported on either surface. This portion serves as a positive electrode tab. Like the negative electrode tabs (portion 3c), the positive electrode tabs do not overlap the negative electrodes 3. Further, the positive electrode tabs are located on the opposite side of the electrode group 1 with respect to the negative electrode tabs (portion 3c). The positive electrode tabs are electrically connected to the strip-shaped positive electrode terminal 7. A tip of the strip-shaped positive electrode terminal 7 is located on the opposite side relative to the negative electrode terminal 6 and drawn to the outside from the container member 2.

The secondary battery according to the third embodiment includes the active material according to the first embodiment as the negative electrode active material. Therefore, this secondary battery can exhibit excellent rapid charge-discharge characteristics and cycle life characteristics.

Fourth Embodiment

According to a fourth embodiment, a battery module is provided. The battery module according to the fourth embodiment includes plural secondary batteries according to the third embodiment.

In the battery module according to the fourth embodiment, each of the single batteries may be arranged electrically connected in series, in parallel, or in a combination of in-series connection and in-parallel connection.

An example of the battery module according to the fourth embodiment will be described next with reference to the drawings.

Figure 7:
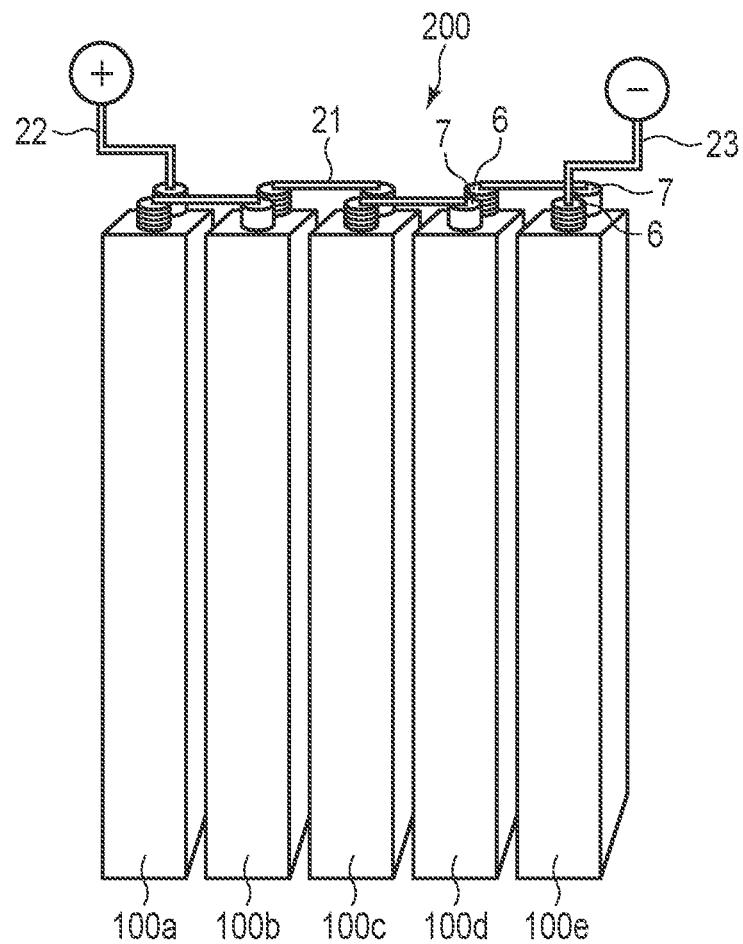
FIG. 7 is a perspective view schematically illustrating an example of a battery module according to an embodiment.

FIG. 7 is a perspective view schematically showing an example of the battery module according to the fourth embodiment. A battery module 200 shown in FIG. 7 includes five single-batteries 100a to 100e, four bus bars 21, a positive electrode-side lead 22, and a negative electrode-side lead 23. Each of the five single-batteries 100a to 100e is a secondary battery according to the third embodiment.

The bus bars 21 connects a negative electrode terminal 6 of a single unit cell 100a to a positive electrode terminal 7 of an adjacently positioned unit cell 100b. In this way, the five unit cells 100a to 100e are connected in series by the four bus bars 21. That is, the battery module 200 shown in FIG. 7 is a battery module of five in-series connection. Although an example is not illustrated, in a battery module containing a plurality of unit cells electrically connected in parallel, the plurality of unit cells may be electrically connected by connecting the plurality of negative electrode terminals to each other with busbars and also connecting the plurality of positive electrode terminals to each other with busbars, for example.

The positive electrode terminal 7 of at least one battery among the five unit cells 100a to 100e is electrically connected to a positive electrode lead 22 for external connection. Also, the negative electrode terminal 6 of at least one battery among the five unit cells 100a to 100e is electrically connected to a negative electrode lead 23 for external connection.

A battery module according to the fourth embodiment includes the secondary battery according to the third embodiment. Therefore, the battery module can exhibit excellent rapid charge-discharge characteristics and cycle life characteristics.

Fifth Embodiment

According to the fifth embodiment, a battery pack is provided. The battery pack includes the battery module according to the fourth embodiment. The battery pack may also be equipped with a single secondary battery according to the third embodiment instead of the battery module according to the fourth embodiment.

The battery pack according to the fifth embodiment may further include a protective circuit. The protective circuit has a function to control charging and discharging of the secondary battery. Alternatively, a circuit included in equipment where the battery pack serves as a power source (for example, electronic devices, vehicles, and the like) may be used as the protective circuit for the battery pack.

Moreover, the battery pack according to the fifth embodiment may further include an external power distribution terminal. The external power distribution terminal is configured to externally output current from the secondary battery, and to input external current into the secondary battery. In other words, when the battery pack is used as a power source, the current is provided out via the external power distribution terminal. When the battery pack is charged, the charging current (including regenerative energy of a motive force of vehicles such as automobiles) is provided to the battery pack via the external power distribution terminal.

Next, an example of a battery pack according to the fifth embodiment will be described with reference to the drawings.

Figure 8:
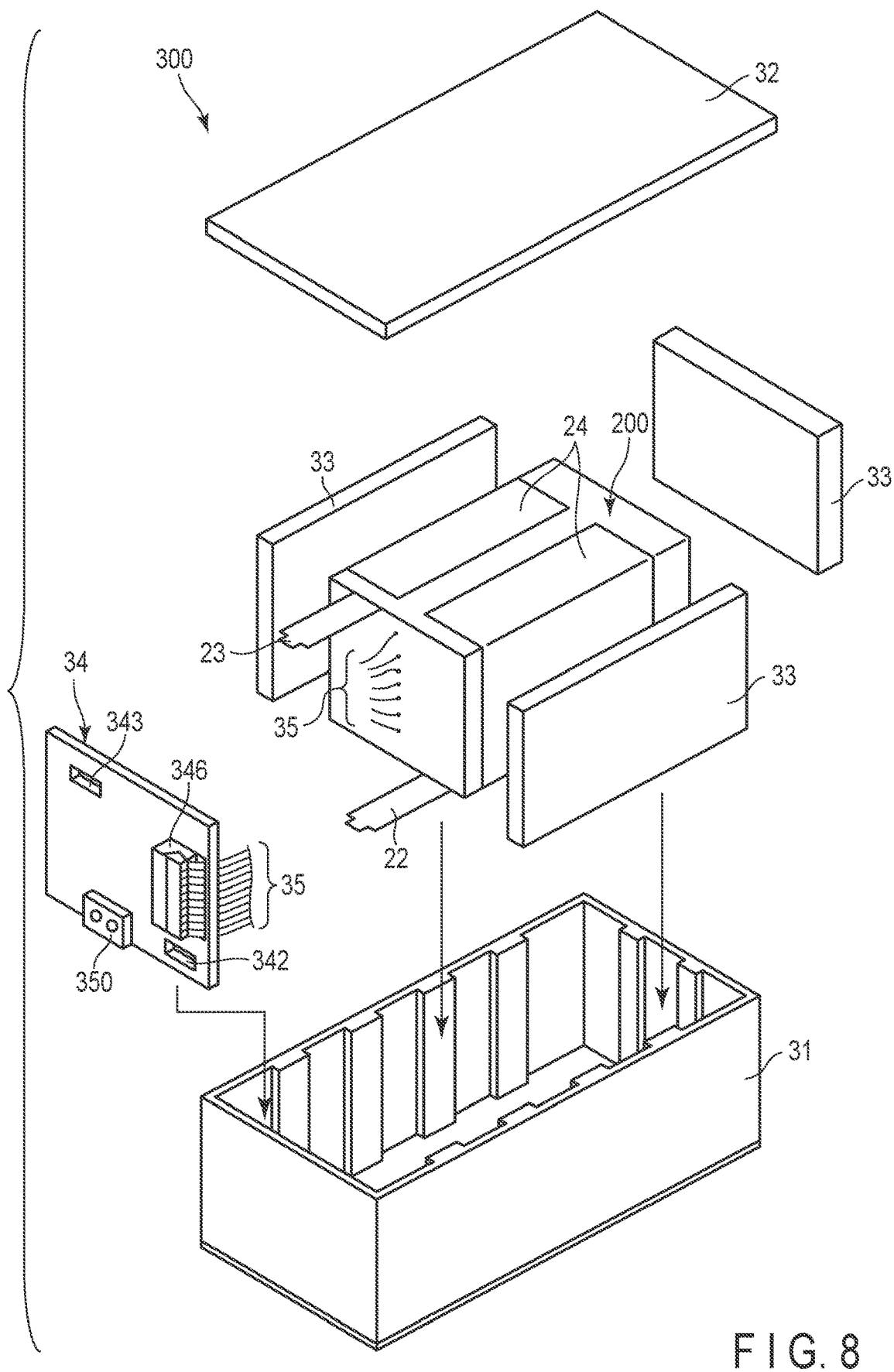
FIG. 8 is an exploded perspective view schematically illustrating an example of a battery pack according to an embodiment.
Figure 9:
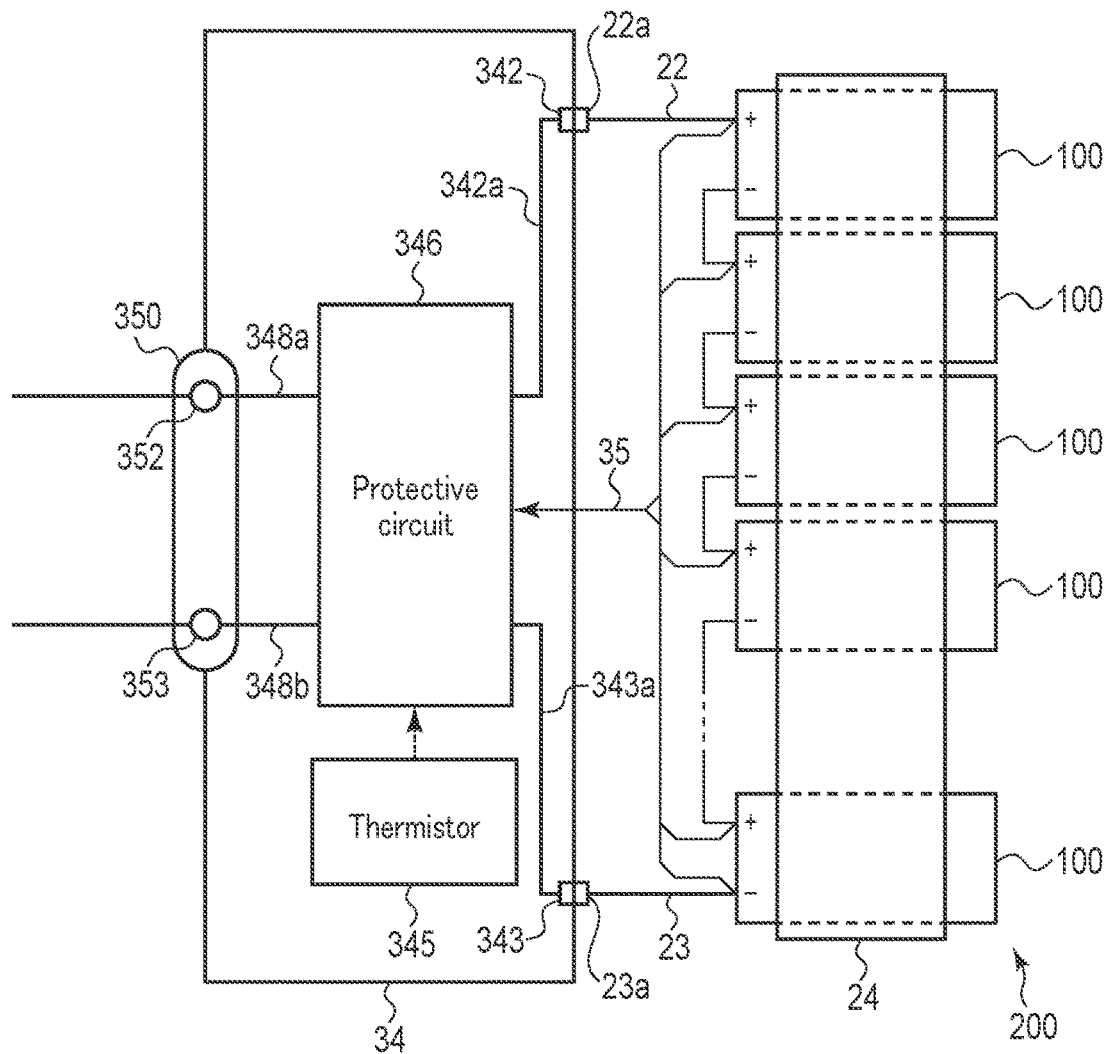
FIG. 9 is a block diagram illustrating an example of an electric circuit of the battery pack illustrated in FIG. 8.

FIG. 8 is an exploded perspective view schematically showing an example of the battery pack according to the fifth embodiment. FIG. 9 is a block diagram showing an example of an electric circuit of the battery pack shown in FIG. 8.

A battery pack 300 shown in FIGS. 8 and 9 includes a housing container 31, a lid 32, protective sheets 33, a battery module 200, a printed wiring board 34, wires 35, and an insulating plate (not shown).

A housing container 31 shown in FIG. 8 is a bottomed-square-shaped container having a rectangular bottom surface. The housing container 31 is configured to house protective sheet 33, a battery module 200, a printed wiring board 34, and wires 35. A lid 32 has a rectangular shape. The lid 32 covers the housing container 31 to house the battery module 200 and the like. Although not shown, opening(s) or connection terminal(s) for connecting to external device(s) and the like are provided on the housing container 31 and lid 32.

The battery module 200 includes plural unit cells 100, a positive electrode-side lead 22, a negative electrode-side lead 23, and an adhesive tape 24.

At least one in the plurality of unit cells 100 is a secondary battery according to the second embodiment. Each unit cell 100 in the plurality of unit cells 100 is electrically connected in series, as shown in FIG. 9. The plurality of unit cells 100 may alternatively be electrically connected in parallel, or connected in a combination of in-series connection and in-parallel connection. If the plurality of unit cells 100 is connected in parallel, the battery capacity increases as compared to a case where they are connected in series.

The adhesive tape 24 fastens the plural unit cells 100. The plural unit cells 100 may be fixed using a heat-shrinkable tape in place of the adhesive tape 24. In this case, the protective sheets 33 are arranged on both side surfaces of the battery module 200, and the heat-shrinkable tape is wound around the battery module 200 and protective sheets 33. After that, the heat-shrinkable tape is shrunk by heating to bundle the plural unit cells 100.

One terminal of a positive electrode lead 22 is connected to a battery module 200. One terminal of the positive electrode lead 22 is electrically connected to the positive electrode of one or more unit cells 100. One terminal of a negative electrode lead 23 is connected to the battery module 200. One terminal of the negative electrode lead 23 is electrically connected to the negative electrode of one or more unit cells 100.

The printed wiring board 34 is arranged on the inner surface of the housing container 31 along the short side direction. The printed wiring board 34 includes a positive electrode connector 342, a negative electrode connector 343, a thermistor 345, a protective circuit 346, wirings 342a and 343a, an external power distribution terminal 350, a plus-side wire (positive-side wire) 348a, and a minus-side wire (negative-side wire) 348b. One principal surface of the printed wiring board 34 faces one side surface of the battery module 200. An insulating plate (not shown) is disposed in between the printed wiring board 34 and the battery module 200.

The other terminal 22a of the positive electrode lead 22 is electrically connected to a positive electrode connector 342. The other terminal 23a of the negative electrode lead 23 is electrically connected to a negative electrode connector 343.

The thermistor 345 is fixed to one principal surface of the printed wiring board 34. The thermistor 345 detects the temperature of each unit cell 100 and transmits detection signals to the protective circuit 346.

The external power distribution terminal 350 is fixed to the other principal surface of the printed wiring board 34. The external power distribution terminal 350 is electrically connected to device(s) that exists outside the battery pack 300. The external power distribution terminal 350 includes a positive side terminal 352 and a negative side terminal 353.

The protective circuit 346 is fixed to the other principal surface of the printed wiring board 34. The protective circuit 346 is connected to the positive side terminal 352 via the plus-side wire 348a. The protective circuit 346 is connected to the negative side terminal 353 via the minus-side wire 348b. In addition, the protective circuit 346 is electrically connected to the positive electrode connector 342 via the wiring 342a. The protective circuit 346 is electrically connected to the negative electrode connector 343 via the wiring 343a. Furthermore, the protective circuit 346 is electrically connected to each unit cell 100 in the plurality of unit cells 100 via the wires 35.

The protective sheets 33 are arranged on both inner surfaces of the housing container 31 along the long side direction and on one inner surface of the housing container 31 along the short side direction facing the printed wiring board 34 through the battery module 200. The protective sheet 33 is made of, for example, resin or rubber.

The protective circuit 346 controls charging and discharging of the plurality of unit cells 100. The protective circuit 346 is also configured to cut off electric connection between the protective circuit 346 and the external power distribution terminal 350 (the positive side terminal 352 and the negative side terminal 353) to the external devices, based on detection signals transmitted from the thermistor 345 or detection signals transmitted from each unit cell 100 or the battery module 200.

An example of the detection signal transmitted from the thermistor 345 is a signal indicating that the temperature of the unit cell(s) 100 is detected to be a predetermined temperature or more. An example of the detection signal transmitted from each unit cell 100 or the battery module 200 is a signal indicating detection of over-charge, over-discharge, and overcurrent of the unit cell(s) 100. When detecting over-charge or the like for each of the unit cells 100, the battery voltage may be detected, or a positive electrode potential or negative electrode potential may be detected. In the latter case, a lithium electrode to be used as a reference electrode may be inserted into each unit cell 100.

Note, that as the protective circuit 346, a circuit included in a device (for example, an electronic device or an automobile) that uses the battery pack 300 as a power source may be used.

As described above, the battery pack 300 includes the external power distribution terminal 350. Hence, the battery pack 300 can output current from the battery module 200 to an external device and input current from an external device to the battery module 200 via the external power distribution terminal 350. In other words, when using the battery pack 300 as a power source, the current from the battery module 200 is supplied to an external device via the external power distribution terminal 350. When charging the battery pack 300, a charge current from an external device is supplied to the battery pack 300 via the external power distribution terminal 350. If the battery pack 300 is used as an onboard battery, the regenerative energy of the motive force of a vehicle can be used as the charge current from the external device.

Note that the battery pack 300 may include a plurality of battery modules 200. In this case, the plurality of battery modules 200 may be connected in series, in parallel, or connected in a combination of in-series connection and in-parallel connection. The printed wiring board 34 and the wires 35 may be omitted. In this case, the positive electrode lead 22 and the negative electrode lead 23 may be used as the positive side terminal and the negative side terminal of the external power distribution terminal, respectively.

Such a battery pack is used for, for example, an application required to have the excellent cycle performance when a large current is taken out. More specifically, the battery pack is used as, for example, a power source for electronic devices, a stationary battery, or an onboard battery for various kinds of vehicles. An example of the electronic device is a digital camera. The battery pack is particularly favorably used as an onboard battery.

The battery pack according to the fifth embodiment includes the secondary battery according to the third embodiment or the battery module according to the fourth embodiment. Therefore, the battery pack can exhibit excellent rapid charge-discharge characteristics and cycle life characteristics.

Sixth Embodiment

According to the sixth embodiment, a vehicle is provided. The vehicle includes the battery pack according to the fifth embodiment.

In a vehicle according to the sixth embodiment, the battery pack is configured, for example, to recover regenerative energy from motive force of the vehicle. The vehicle may include a mechanism configured to convert kinetic energy of the vehicle into regenerative energy.

Examples of the vehicle according to the sixth embodiment include two- to four-wheeled hybrid electric automobiles, two- to four-wheeled electric automobiles, electric assist bicycles, and railway cars.

In the vehicle, the installing position of the battery pack is not particularly limited. For example, the battery pack may be installed in the engine compartment of the vehicle, in rear parts of the vehicle, or under seats.

A plurality of battery packs is loaded on the vehicle. In this case, the batteries included in each of the battery packs may be electrically connected to each other in series, in parallel, or in a combination of in-series connection and in-parallel connection. For example, in the case where each battery pack includes a battery module, the battery modules may be electrically connected to each other in series, in parallel, or in a combination of in-series connection and in-parallel connection. Alternatively, in the case where each battery pack includes a single battery, each of the batteries may be electrically connected to each other in series, in parallel, or in a combination of in-series connection and in-parallel connection.

Next, one example of the vehicle according to the sixth embodiment will be described with reference to the drawings.

Figure 10:
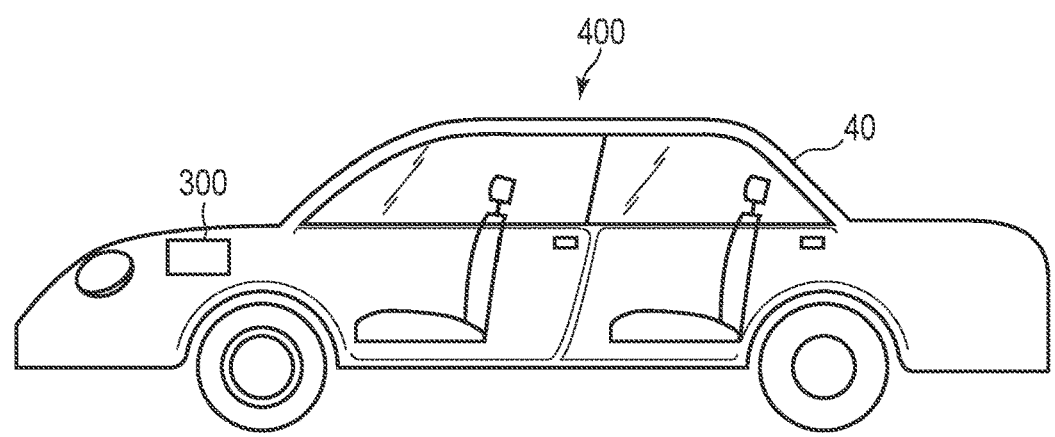
FIG. 10 is a cross-sectional view schematically illustrating an example of a vehicle according to an embodiment.

FIG. 10 is a partially transparent diagram schematically illustrating one example of a vehicle according to the embodiment.

A vehicle 400 illustrated in FIG. 10 includes a vehicle body 40 and a battery pack 300 according to the embodiment. In the example illustrated in FIG. 10, the vehicle 400 is a four-wheeled automobile.

A plurality of the battery packs 300 may be loaded on the vehicle 400. In this case, the batteries included in the battery packs 300 (for example, unit cell or battery modules) may be connected in series, connected in parallel, or connected in a combination of in-series connection and in-parallel connection.

In FIG. 10, the battery pack 300 is installed in an engine compartment located at the front of the vehicle body 40. As described above, the battery pack 300 may be installed in rear sections of the vehicle body 40, or under a seat. The battery pack 300 may be used as a power source of the vehicle 400. In addition, the battery pack 300 can recover regenerative energy of a motive force of the vehicle 400.

Next, an embodiment of the vehicle according to the sixth embodiment will be described with reference to FIG. 11.

FIG. 11 is a diagram schematically illustrating one example of a control system related to an electrical system in the vehicle according to the sixth embodiment. The vehicle 400 illustrated in FIG. 11 is an electric automobile.

The vehicle 400, shown in FIG. 11, includes a vehicle body 40, a vehicle power source 41, a vehicle ECU (electric control unit) 42, which is a master controller of the vehicle power source 41, an external terminal (an external power connection terminal) 43, an inverter 44, and a drive motor 45.

The vehicle 400 includes the vehicle power source 41, for example, in the engine compartment, in the rear sections of the automobile body, or under a seat. In FIG. 9, the position of the vehicle power source 41 installed in the vehicle 400 is schematically shown.

The vehicle power source 41 includes plural (for example, three) battery packs 300a, 300b and 300c, a battery management unit (BMU) 411, and a communication bus 412.

A battery pack 300a is provided with a battery module 200a and a battery module monitoring apparatus 301a (for example, voltage temperature monitoring (VTM)). A battery pack 300b is provided with a battery module 200b and a battery module monitoring apparatus 301b. A battery pack 300c is provided with a battery module 200c and a battery module monitoring apparatus 301c. The battery packs 300a to 300c are battery packs similar to the battery pack 300 described earlier, and the battery modules 200a to 200c are battery modules similar to the battery module 200 described earlier. The battery modules 200a to 200c are electrically connected in series. The battery packs 300a, 300b, and 300c are removable independently of each other, and each can be replaced with a different battery pack 300.

Each of the battery modules 200a to 200c includes plural battery cells connected in series. At least one of the plural battery cells is the secondary battery according to the second embodiment. The battery modules 200a to 200c each perform charging and discharging via a positive electrode terminal 413 and a negative electrode terminal 414.

A battery management apparatus 411 communicates with the battery module monitoring apparatus 301a to 301c, and collects information related to the voltage, temperature, and the like for each of the unit cells 100 included in the battery modules 200a to 200c included in the vehicle power source 41. With this arrangement, the battery management apparatus 411 collects information related to the maintenance of the vehicle power source 41.

The battery management apparatus 411 and the battery module monitoring apparatus 301a to 301c are connected via a communication bus 412. In the communication bus 412, a set of communication wires are shared with a plurality of nodes (the battery management apparatus 411 and one or more of the battery module monitoring apparatus 301a to 301c). The communication bus 412 is a communication bus, for example, configured in accordance with the controller area network (CAN) standard.

The battery module monitoring units 301a to 301c measure a voltage and a temperature of each battery cell in the battery modules 200a to 200c based on commands from the battery management unit 411. It is possible, however, to measure the temperatures only at several points per battery module, and the temperatures of all of the battery cells need not be measured.

The vehicle power source 41 can also have an electromagnetic contactor (for example, a switch apparatus 415 illustrated in FIG. 11) that switches the presence or absence of an electrical connection between a positive electrode terminal 413 and a negative electrode terminal 414. The switch apparatus 415 includes a pre-charge switch (not illustrated) that turns on when the battery modules 200a to 200c are charged, and a main switch (not illustrated) that turns on when the output from the battery modules 200a to 200c is supplied to the load. Each of the pre-charge switch and the main switch is provided with a relay circuit (not illustrated) that switches on or off according to a signal supplied to a coil disposed near a switching element. The electromagnetic contactor such as the switch apparatus 415 is controlled according to of control signals from the battery management apparatus 411 or the vehicle ECU 42 that controls the entire operation of the vehicle 400.

The inverter 44 converts an inputted direct current voltage to a three-phase alternate current (AC) high voltage for driving a motor. Three-phase output terminal(s) of the inverter 44 is (are) connected to each three-phase input terminal of the drive motor 45. The inverter 44 is controlled based on control signals from the battery management apparatus 411, or the vehicle ECU 42 which controls the entire operation of the vehicle. By controlling the inverter 44, the output voltage from the inverter 44 is adjusted.

The drive motor 45 is rotated by electric power supplied from the inverter 44. The driving force produced by the rotation of the drive motor 45 is transmitted to an axle (or axles) and drive wheels W via a differential gear unit for example.

The vehicle 400 also includes a regenerative brake mechanism (regenerator), though not shown. The regenerative brake mechanism rotates the drive motor 45 when the vehicle 400 is braked, and converts kinetic energy into regenerative energy, as electric energy. The regenerative energy, recovered in the regenerative brake mechanism, is inputted into the inverter 44 and converted to direct current. The converted direct current is inputted into the vehicle power source 41.

One terminal of a connection line L1 is connected to the negative electrode terminal 414 of the vehicle power source 41. The other terminal of the connection line L1 is connected to a negative electrode input terminal 417 of the inverter 44. On the connection line L1, a current detector (current detection circuit) 416 is provided inside the battery management apparatus 411 between the negative electrode terminal 414 and the negative electrode input terminal 417.

One terminal of a connection line L2 is connected to the positive electrode terminal 413 of the vehicle power source 41. The other terminal of the connection line L2 is connected to a positive electrode input terminal 418 of the inverter 44. On the connection line L2, the switch apparatus 415 is provided between the positive electrode terminal 413 and the positive electrode input terminal 418.

The external terminal 43 is connected to the battery management apparatus 411. The external terminal 43 can be connected to, for example, an external power source.

The vehicle ECU 42 cooperatively controls the vehicle power source 41, the switch apparatus 415, the inverter 44, and the like together with other management apparatus and control apparatus, including the battery management apparatus 411, in response to operation input from a driver or the like. By the cooperative control by the vehicle ECU 42 and the like, the output of electric power from the vehicle power source 41, the charging of the vehicle power source 41, and the like are controlled, and the vehicle 400 is managed as a whole. Data related to the maintenance of the vehicle power source 41, such as the remaining capacity of the vehicle power source 41, is transferred between the battery management apparatus 411 and the vehicle ECU 42 by a communication line.

The vehicle according to the sixth embodiment includes the battery pack according to the fifth embodiment. Therefore, according to the present embodiment, it is possible to provide a vehicle mounted with a battery pack capable of exhibiting excellent rapid charge-discharge characteristics and cycle life characteristics.

EXAMPLES

Although Examples will be described hereinafter, the embodiments are not limited to Examples to be described hereinafter.

Examples 1 to 6

An electrode material was synthesized by a solid phase synthesis method which will be described below.

First, mixing was performed in a dry ball mill at a molar ratio between $Nb_2O_5$ particles and $TiO_2$ particles of 5:2 in order to obtain $Nb_{10}Ti_2O_{29}$. The obtained powder was placed in an alumina crucible, heated at a temperature of 800° C. for 10 hours, ground and mixed, and pre-fired (first firing) again at a temperature of 800° C. for 10 hours to give precursor particles. In Example 1, potassium carbonate ($K_2CO_3$) was added to the precursor particles so that the concentration of the element K was 100 ppm with respect to the obtained active material particles, and wet mixing was performed using pure water to give a wet mixture. Similarly, potassium carbonate was added so that the concentration of the element K was 200 ppm in Example 2, 500 ppm in Example 3, 1000 ppm in Example 4, 1500 ppm in Example 5, and 2000 ppm in Example 6, respectively.

Next, the wet mixtures of the precursor particles and $K_2CO_3$ were fired at a temperature of 1150° C. for 3 hours through main firing (second firing). The powders thus obtained were ground under conditions of 500 rpm and 30 minutes, using an agate ball mill using a grinding medium having a diameter of 10 mm to produce electrode materials according to Examples 1 to 6.

Example 7

An electrode material was synthesized by the same method as in Example 1 except that iron chloride ($FeCl_3$)

was added to the obtained active material particles so that the concentration of the element Fe was 500 ppm.

Example 8

An electrode material was synthesized by the same method as in Example 1 except that orthophosphoric acid ($H_3PO_4$) was added to the obtained active material particles so that the concentration of the element P was 500 ppm.

Examples 9 to 12

In order to adjust the grain size distribution, the grinding conditions for electrode materials synthesized by the same method as in Example 3 were changed.

In Example 9, the grinding time with the agate ball mill was shortened to 15 minutes. In Example 10, grinding media having a diameter of 10 mm and a diameter of 5 mm were used at a volume ratio of 1:1 in the agate ball mil to perform grinding for 60 minutes. In Example 11, first, the powder obtained after the main firing was coarsely ground in a mortar, and then the coarsely ground sample was dispersed in water and separated by sedimentation to collect particles having a large D90. The thus-collected particles having a large D90 were mixed with the particles obtained in Example 3 to produce an electrode material. In Example 12, first, the electrode material obtained according to Example 3 was subjected to centrifugation to collect particles having a small D10. The thus-collected particles having a small D10 were mixed with the particles obtained in Example 3 to produce an electrode material.

Examples 13 to 18

Electrode materials were synthesized by the same method as in Example 1 except that, as the niobium-titanium composite oxide, $Nb_2O_5$ particles and $TiO_2$ particles were mixed while adjusting the molar ratio so that the compositions shown in the column "Composite oxide composition" of Table 1 below were obtained, and that at least one kind selected from the group consisting of potassium carbonate ($K_2CO_3$), iron chloride ($FeCl_3$) and orthophosphoric acid ($H_3PO_4$) was added so that the concentrations of the element A were the concentrations shown in the column "Element A/concentration" of Table 1.

Examples 19 to 32

Electrode materials were synthesized by the same method as in Example 1 except that, as the niobium-titanium composite oxide, $Nb_2O_5$ particles, $TiO_2$ particles and $Ta_2O_5$ particles were mixed while adjusting the molar ratio so that the compositions shown in the column "Composite oxide composition" of Tables 1 and 3 below were obtained, and that at least one kind selected from the group consisting of potassium carbonate ($K_2CO_3$), iron chloride ($FeCl_3$) and orthophosphoric acid ($H_3PO_4$) was added so that the concentrations of the element A were the concentrations shown in the column "Element A/concentration" of Table 1.

Example 33

An electrode material was synthesized by the same method as in Example 1 except that, as the niobium-titanium composite oxide, $Nb_2O_5$ particles, $TiO_2$ particles and $SnO_2$ particles were mixed while adjusting the molar ratio so that $Nb_2Sn_{0.5}Ti_{0.5}O_7$ was obtained, and that potassium carbonate ($K_2CO_3$) and orthophosphoric acid ($H_3PO_4$) were added so that the concentration of the element A was the concentration shown in the column "Element A/concentration" of Table 1.

Example 34

An electrode material was synthesized by the same method as in Example 1 except that, as the niobium-titanium composite oxide, $Nb_2O_5$ particles, $TiO_2$ particles, $V_2O_5$ particles and $ZrO_2$ particles were mixed while adjusting the molar ratio so that $Nb_{9.5}V_{0.5}ZrTiO_{29}$ was obtained, and that potassium carbonate ($K_2CO_3$) and orthophosphoric acid ($H_3PO_4$) were added so that the concentration of the element A was the concentration shown in the column "Element A/concentration" of Table 1.

Example 35

An electrode material was synthesized by the same method as in Example 1 except that, as the niobium-titanium composite oxide, $Nb_2O_5$ particles, $TiO_2$ particles, $Ta_2O_5$ particles, $WO_3$ particles and $HfO_2$ particles were mixed while adjusting the molar ratio so that $Nb_{12.9}TaW_{0.1}Ti_{0.9}Hf_{0.1}O_{37}$ was obtained, and that potassium carbonate ($K_2CO_3$) and orthophosphoric acid ($H_3PO_4$) were added so that the concentration of the element A was the concentration shown in the column "Element A/concentration" of Table 1.

Example 36

An electrode material was synthesized by the same method as in Example 1 except that, as the niobium-titanium composite oxide, $Nb_2O_5$ particles, $TiO_2$ particles, $Ta_2O_5$ particles and $ZrO_2$ particles were mixed while adjusting the molar ratio so that $Nb_{11.5}Ta_{2.5}Ti_{0.6}Zr_{0.4}O_{37}$ was obtained, and that potassium carbonate ($K_2CO_3$) and orthophosphoric acid ($H_3PO_4$) were added so that the concentration of the element A was the concentration shown in the column "Element A/concentration" of Table 1.

Example 37

An electrode material was synthesized by the same method as in Example 1 except that, as the niobium-titanium composite oxide, $Nb_2O_5$ particles, $TiO_2$ particles, $Ta_2O_5$ particles, $MoO_3$ particles and $SnO_2$ particles were mixed while adjusting the molar ratio so that $Nb_{19}Ta_{4.9}Mo_{0.1}Ti_{0.7}Sn_{0.3}O_{62}$ was obtained, and that potassium carbonate ($K_2CO_2$) and orthophosphoric acid ($H_3PO_4$) were added so that the concentration of the element A was the concentration shown in the column "Element A/concentration" of Table 1.

Comparative Examples 1 to 4

Mixing was performed in a dry ball mill at a molar ratio between $Nb_2O_5$ particles and $TiO_2$ particles of 5:2 in order to obtain $Nb_{10}Ti_2O_{29}$. The obtained powder was placed in an alumina crucible, heated at a temperature of 800° C. for 10 hours, ground and mixed, and pre-fired (first firing) again at a temperature of 800° C. for 10 hours. In Comparative Example 1, the obtained precursor particles were subjected to main firing at a temperature of 1150° C. for 3 hours without adding a supply source of the element A (without adding anything).

In Comparative Example 2, potassium carbonate was added to the precursor particles obtained after the pre-firing so that the concentration of the element K was 50 ppm, and wet mixing was performed using pure water to give a wet mixture. The wet mixture was then subjected to main firing at a temperature of 1150° C. for 3 hours.

Similarly, in Comparative Example 3, potassium carbonate was added so that the concentration of the element K was 2200 ppm, and wet mixing was performed. Then, the mixture was subjected to main firing. Further, in Comparative Example 4, sodium carbonate ($Na_2CO_3$) was added to the precursor particles obtained after the pre-firing so that the concentration of the element Na was 500 ppm, and wet mixing was performed. Then, the mixture was subjected to main firing.

In each of Comparative Examples 1 to 4, the powders obtained after the main firing were ground using a 10-mm φ agate ball mill at 500 rpm for 30 minutes to produce electrode materials according to Comparative Examples 1 to 4.

Comparative Examples 5 to 7

As the niobium-titanium composite oxide, $Nb_2O_5$ particles and $TiO_2$ particles were mixed while adjusting the molar ratio so that the compositions shown in the column "Composite oxide composition" of Table 1 below were obtained, and the mixture was ground and mixed in a dry ball mill. The obtained powder was placed in an alumina crucible and fired at a temperature of 1150° C. for 12 hours to give niobium-titanium composite oxide powder. This niobium-titanium composite oxide powder was subjected to an agate ball mill using a grinding medium having a diameter of 10 mm and ground so that D50 was about 3 μm to produce electrode materials according to Comparative Examples 5 to 7.

Comparative Example 8

An electrode material was synthesized by the same method as in Comparative Example 5, except that, as the niobium-titanium composite oxide, $Nb_2O$ particles, $TiO_2$ particles and $Ta_2O_5$ particles were mixed while adjusting the molar ratio so that $Nb_{2.01}Ta_{0.001}Ti_{0.989}O_7$ was obtained.

Comparative Example 9

An electrode material was synthesized by the same method as in Comparative Example 5, except that, as the niobium-titanium composite oxide, $Nb_2O_5$ particles, $TiO_2$ particles, $Ta_2O_5$ particles and $ZrO_2$ particles were mixed while adjusting the molar ratio so that $Nb_{11.5}Ta_{2.5}Ti_{0.6}Zr_{0.4}O_{37}$ was obtained.

Comparative Example 10

Mixing was performed in a dry ball mill at a molar ratio between $Nb_2O_5$ particles and $TiO_2$ particles of 1:1 in order to obtain $Nb_2TiO_7$ having an Nb/Ti ratio of 2. The obtained powder was placed in an alumina crucible, heated at a temperature of 800° C. for 10 hours, ground and mixed, and pre-fired (first firing) again at a temperature of 800° C. for 10 hours. Potassium carbonate ($K_2CO_3$) was added to the obtained precursor particles so that the concentration of the element K was 500 ppm with respect to the obtained active material particles, and wet mixing was performed using pure water to give a wet mixture. Next, the wet mixtures of the precursor particles and $K_2CO_3$ were fired at a temperature of 1150° C. for 3 hours through main firing (second firing). The powder thus obtained was ground using an agate ball mill using a grinding medium having a diameter of 10 mm until D50 was about 3 μm to produce an electrode material according to Comparative Example 10.

<ICP Analysis>

TCP analysis was performed on the electrode materials obtained in the Examples and the Comparative Examples to confirm the average composition of the niobium-titanium composite oxide, the type and concentration of the element A. These results are shown in Tables 1 and 3 below.

<Powder X-Ray Diffraction Measurement and Calculation of Peak Intensity Ratio $I_H/I_L$>

The powder X-ray diffraction measurement described in the first embodiment was performed on the electrode materials obtained in the Examples and the Comparative Examples under conditions of a sampling interval of 0.01° and a scanning rate of 2°/min. In the obtained diffraction diagram, in the phase attributed to monoclinic $Nb_2TiO_7$, two peaks, i.e., $P_H$ appeared on the high-angle side and $P_L$ appeared on the low-angle side, within the range of 2θ=44°±1.0°. The peak intensity ratio ($I_H/I_L$) was calculated. Similarly, the peak intensity ratio ($I_H/I_L$) was calculated for the monoclinic $Nb_{10}Ti_2O_{29}$ phase, the monoclinic $Nb_{14}TiO_{37}$ phase, and the monoclinic $Nb_{24}TiO_{62}$. Furthermore, the crystallite diameter was investigated by analyzing the diffraction diagram by the Rietveld method. These results are shown in Tables 1 and 3.

<SEM-EDX Observation of Electrode Materials>

The electrode materials obtained in the Examples and the Comparative Examples were embedded in a resin, and the inside of the samples was carved out by ion milling. After that, the inside of the samples was observed, and the presence concentration of the element A at the particle interface of the active material particles according to each example was confirmed. As a result, in each of Examples 1 to 37 and Comparative Examples 2 to 4, the presence concentration of the element A was the highest at the particle interface.

<Laser Diffraction/Scattering Method>

The electrode materials obtained in the Examples and the Comparative Examples were subjected to grain size distribution measurement by the laser diffraction/scattering method to determine D10, D50 and D90. Moreover, the ratio (D10/D50) and the ratio (D50/D90) were calculated from these values. These results are shown in Tables 2 and 4.

<Electrochemical Measurement>

Using the electrode materials obtained in the Examples and the Comparative Examples, an electrochemical measurement cell according to each example was prepared.

The electrode material powder (100% by mass) obtained in each example, 10% by mass of acetylene black as a conductive agent, 5% by mass of carbon nanofiber, and 10% by mass of polyvinylidene fluoride (PVdF) as a binder were added to N-methylpyrrolidone (NMP), and they were mixed to give a slurry. This slurry was applied to one side of a current collector made of an aluminum foil having a thickness of 12 μm, dried, and pressed to prepare an electrode having an electrode density of 2.4 g/cm³.

On the other hand, an electrolytic solution was prepared by dissolving $LiPF_6$ supporting salt at a concentration of 1 mol/L in a mixed solvent in which ethylene carbonate (EC) and diethyl carbonate (DEC) were mixed at a volume ratio of 1:2.

The obtained electrode was used as a working electrode and Li metal was used as a counter electrode and also Li metal was used as a reference electrode to prepare a three-electrode-type beaker cell using the obtained electrolytic solution, and electrochemical characteristics thereof were evaluated as will be described below.

In the present examples, since the lithium metal is used as the counter electrode in the three-electrode-type beaker cell for measurement, electrode potentials of the Examples and the Comparative Examples are nobler than that of the counter electrode, and thus, operate as a positive electrode. Thus, the definitions of charging and discharging become opposite when the electrodes of the Examples and the Comparative Examples are used as a negative electrode. Here, in the present Examples, directions in which lithium ions are inserted into the electrode are collectively referred to as charging, and directions of extracting lithium ions from the electrode are consistently referred to as discharging in order to avoid confusion. Incidentally, the active materials of the present embodiments can operate as a negative electrode by combining with a known positive electrode material.

The prepared electrochemical measurement cell was charged and discharged in a potential range of 1.0 V to 3.0 V (vs. Li/Li$^+$) with respect to metallic lithium electrode. A charge/discharge current value was set to 0.2 C (hourly discharge rate), and 0.2 C discharge capacity was confirmed at room temperature. The value of 0.2 C discharge capacity is an index of energy density. In addition, in order to investigate the rapid discharge characteristics, after confirmation of the 0.2 C discharge capacity, the battery was charged again with the charge current value set to 0.2 C to confirm 5 C rapid discharge capacity at room temperature. Then, a discharge capacity ratio (5 C/0.2 C) was obtained by dividing the 5 C discharge capacity by the 0.2 C discharge capacity. The discharge capacity ratio (5 C/0.2 C) serves as an index for evaluating the rapid charge-discharge characteristics.

Next, in order to confirm that the electrode materials (negative electrode materials) according to the Examples could be charged and discharged stably, the cells of the Examples and the Comparative Examples were subjected to a life test in a 45° C. environment by repeating 0.2 C charge and discharge in a potential range of 1.0 V to 3.0 V (vs. Li/Li$^+$) with respect to metallic lithium electrode. Under the condition, charging and discharging were repeated 100 cycles (the charging and discharging is defined as one cycle), and a discharge capacity retention ratio after 100 cycles was investigated. In order to confirm the discharge capacity retention ratio after 100 cycles, the charging and discharging were performed again at 0.2 C (hourly discharge rate), a cycle capacity retention ratio (%) in a case where an initial discharge capacity is 100% was calculated by dividing the discharge capacity after 100 cycles by an initial discharge capacity and multiplying by 100. The discharge capacity retention ratio after 100 cycles serves as an index for evaluating the cycle life characteristics. The above results are summarized in Tables 2 and 4.

TABLE 1

| | Composite oxide composition | Nb/Ti ratio | Quantities of x, y and z in the general formula | Crystal phase | Element A/ concentration (ppm) | Crystallite diameter (nm) | Peak intensity ratio $I_H/I_L$ |
|---|---|---|---|---|---|---|---|
| Example 1 | $Nb_{10}Ti_2O_{29}$ | 5 | x = 0, y = 0 | Monoclinic $Nb_{10}Ti_2O_{29}$ | K/100 | 112 | 1.06 |
| Example 2 | $Nb_{10}Ti_2O_{29}$ | 5 | x = 0, y = 0 | Monoclinic $Nb_{10}Ti_2O_{29}$ | K/200 | 117 | 1.04 |
| Example 3 | $Nb_{10}Ti_2O_{29}$ | 5 | x = 0, y = 0 | Monoclinic $Nb_{10}Ti_2O_{29}$ | K/500 | 111 | 1.05 |
| Example 4 | $Nb_{10}Ti_2O_{29}$ | 5 | x = 0, y = 0 | Monoclinic $Nb_{10}Ti_2O_{29}$ | K/1000 | 110 | 1.06 |
| Example 5 | $Nb_{10}Ti_2O_{29}$ | 5 | x = 0, y = 0 | Monoclinic $Nb_{10}Ti_2O_{29}$ | K/1500 | 112 | 1.04 |
| Example 6 | $Nb_{10}Ti_2O_{29}$ | 5 | x = 0, y = 0 | Monoclinic $Nb_{10}Ti_2O_{29}$ | K/2000 | 110 | 1.05 |
| Example 7 | $Nb_{10}Ti_2O_{29}$ | 5 | x = 0, y = 0 | Monoclinic $Nb_{10}Ti_2O_{29}$ | Fe/500 | 105 | 1.05 |
| Example 8 | $Nb_{10}Ti_2O_{29}$ | 5 | x = 0, y = 0 | Monoclinic $Nb_{10}Ti_2O_{29}$ | P/500 | 109 | 1.08 |
| Example 9 | $Nb_{10}Ti_2O_{29}$ | 5 | x = 0, y = 0 | Monoclinic $Nb_{10}Ti_2O_{29}$ | K/500 | 115 | 1.01 |
| Example 10 | $Nb_{10}Ti_2O_{29}$ | 5 | x = 0, y = 0 | Monoclinic $Nb_{10}Ti_2O_{29}$ | K/500 | 95 | 1.02 |
| Example 11 | $Nb_{10}Ti_2O_{29}$ | 5 | x = 0, y = 0 | Monoclinic $Nb_{10}Ti_2O_{29}$ | K/500 | 118 | 1.04 |
| Example 12 | $Nb_{10}Ti_2O_{29}$ | 5 | x = 0, y = 0 | Monoclinic $Nb_{10}Ti_2O_{29}$ | K/500 | 98 | 1.03 |
| Example 13 | $Nb_{14}TiO_{37}$ | 14 | x = 0, y = 0 | Monoclinic $Nb_{14}TiO_{37}$ | K/500, P/500, Fe/500 | 112 | 1.15 |
| Example 14 | $Nb_{24}TiO_{62}$ | 24 | x = 0, y = 0 | Monoclinic $Nb_{24}TiO_{62}$ | K/500, P/500, Fe/500 | 110 | 1.07 |
| Example 15 | $Nb_{2.01}Ti_{0.99}O_7$ | 2.03 | z = 0.01 | Monoclinic $Nb_2TiO_7$ | K/100 | 108 | 0.89 |
| Example 16 | $Nb_{2.05}Ti_{0.95}O_7$ | 2.16 | z = 0.05 | Monoclinic $Nb_2TiO_7$ | K/100, Fe/100 | 100 | 0.87 |
| Example 17 | $Nb_{2.1}Ti_{0.9}O_7$ | 2.33 | z = 0.1 | Monoclinic $Nb_2TiO_7$ | K/500, P/500 | 105 | 0.88 |
| Example 18 | $Nb_{2.2}Ti_{0.8}O_7$ | 2.75 | z = 0.2 | Monoclinic $Nb_2TiO_7$ | K/1000, P/1000 | 107 | 0.86 |
| Example 19 | $Nb_{2.01}Ta_{0.001}Ti_{0.989}O_7$ | 2.03 | z = 0.011 | Monoclinic $Nb_2TiO_7$ | K/100 | 98 | 0.85 |
| Example 20 | $Nb_{2.01}Ta_{0.01}Ti_{0.98}O_7$ | 2.05 | z = 0.02 | Monoclinic $Nb_2TiO_7$ | K/500 | 106 | 0.86 |
| Example 21 | $Nb_{2.05}Ta_{0.01}Ti_{0.94}O_7$ | 2.18 | z = 0.06 | Monoclinic $Nb_2TiO_7$ | K/500, P/500 | 112 | 0.87 |
| Example 22 | $Nb_{2.1}Ta_{0.01}Ti_{0.89}O_7$ | 2.36 | z = 0.11 | Monoclinic $Nb_2TiO_7$ | K/1000, P/1000 | 116 | 0.85 |
| Example 23 | $Nb_{2.2}Ta_{0.01}Ti_{0.79}O_7$ | 2.78 | z = 0.21 | Monoclinic $Nb_2TiO_7$ | K/500, P/500, Fe/500 | 110 | 0.88 |

TABLE 2

| | Volume frequency 10% D10 (μm) | Volume frequency 50% D50 (μm) | Volume frequency 90% D90 (μm) | Ratio D10/D50 | Ratio D50/D90 | Electrode density (g/cm$^3$) | 0.2 C discharge capacity (mAh/g) | 5 C/0.2 C discharge capacity ratio | Cycle capacity retention ratio (%) |
|---|---|---|---|---|---|---|---|---|---|
| Example 1 | 1.9 | 4.8 | 29.5 | 0.40 | 0.16 | 2.6 | 266.7 | 0.71 | 94.3 |
| Example 2 | 1.5 | 3.6 | 19.8 | 0.42 | 0.18 | 2.6 | 267.4 | 0.75 | 92.5 |
| Example 3 | 0.99 | 2.9 | 9.5 | 0.34 | 0.31 | 2.6 | 267.5 | 0.89 | 89.5 |

TABLE 2-continued

|  | Volume frequency 10% D10 (μm) | Volume frequency 50% D50 (μm) | Volume frequency 90% D90 (μm) | Ratio D10/D50 | Ratio D50/D90 | Electrode density (g/cm$^3$) | 0.2 C discharge capacity (mAh/g) | 5 C/0.2 C discharge capacity ratio | Cycle capacity retention ratio (%) |
|---|---|---|---|---|---|---|---|---|---|
| Example 4 | 0.67 | 2.5 | 8.2 | 0.27 | 0.30 | 2.6 | 267.1 | 0.92 | 90.1 |
| Example 5 | 0.51 | 2.3 | 7.2 | 0.22 | 0.32 | 2.7 | 267.8 | 0.93 | 91.4 |
| Example 6 | 0.32 | 1.5 | 6.5 | 0.21 | 0.23 | 2.6 | 267.5 | 0.96 | 87.6 |
| Example 7 | 0.98 | 3 | 9.3 | 0.33 | 0.32 | 2.6 | 266.9 | 0.88 | 92.2 |
| Example 8 | 0.95 | 2.8 | 8.6 | 0.34 | 0.33 | 2.5 | 267 | 0.87 | 91.8 |
| Example 9 | 2.3 | 5.1 | 28.5 | 0.45 | 0.18 | 2.6 | 263.9 | 0.72 | 93.4 |
| Example 10 | 0.25 | 1.1 | 6.1 | 0.23 | 0.18 | 2.4 | 259.1 | 0.97 | 78.9 |
| Example 11 | 1.8 | 5.1 | 32.3 | 0.35 | 0.16 | 2.6 | 264.4 | 0.7 | 94.4 |
| Example 12 | 0.3 | 1.3 | 4.3 | 0.23 | 0.30 | 2.5 | 267.9 | 0.96 | 86.6 |
| Example 13 | 0.49 | 2.7 | 6.9 | 0.18 | 0.39 | 2.6 | 264.5 | 0.91 | 93.8 |
| Example 14 | 0.52 | 2.6 | 7.1 | 0.20 | 0.37 | 2.7 | 263.8 | 0.92 | 92.9 |
| Example 15 | 1.55 | 4.2 | 25.4 | 0.37 | 0.17 | 2.6 | 267.9 | 0.78 | 96.9 |
| Example 16 | 1.38 | 3.6 | 16.5 | 0.38 | 0.22 | 2.6 | 268.4 | 0.81 | 95.7 |
| Example 17 | 0.55 | 2.6 | 7.9 | 0.21 | 0.33 | 2.7 | 269.5 | 0.92 | 95.1 |
| Example 18 | 0.31 | 0.85 | 6.1 | 0.36 | 0.14 | 2.6 | 272.6 | 0.98 | 94.9 |
| Example 19 | 0.87 | 2.9 | 9.5 | 0.30 | 0.31 | 2.7 | 273.5 | 0.8 | 97.3 |
| Example 20 | 0.65 | 2.6 | 8.7 | 0.25 | 0.30 | 2.6 | 273.6 | 0.88 | 96.8 |
| Example 21 | 0.52 | 2.6 | 6.5 | 0.20 | 0.40 | 2.6 | 274.1 | 0.87 | 97.1 |
| Example 22 | 0.38 | 1.2 | 6.2 | 0.32 | 0.19 | 2.5 | 275.4 | 0.95 | 96.9 |
| Example 23 | 0.65 | 2.8 | 7.2 | 0.23 | 0.39 | 2.7 | 276.1 | 0.89 | 95.3 |

TABLE 3

|  | Composite oxide composition | Nb/Ti ratio | Quantities of x, y and z in the general formula | Crystal phase | Element A/ concentration (ppm) | Crystallite diameter (nm) | Peak intensity ratio $I_H/I_L$ |
|---|---|---|---|---|---|---|---|
| Example 24 | $Nb_{9.999}Ta_{0.001}Ti_2O_{29}$ | 4.9995 | x = 0.001, y = 0 | Monoclinic $Nb_{10}Ti_2O_{29}$ | K/100 | 98 | 1.08 |
| Example 25 | $Nb_{9.99}Ta_{0.01}Ti_2O_{29}$ | 4.995 | x = 0.01, y = 0 | Monoclinic $Nb_{10}Ti_2O_{29}$ | K/500, P/500 | 109 | 1.1 |
| Example 26 | $Nb_{9.9}Ta_{0.1}Ti_2O_{29}$ | 4.95 | x = 0.1, y = 0 | Monoclinic $Nb_{10}Ti_2O_{29}$ | K/500, P/500, Fe/500 | 106 | 1.05 |
| Example 27 | $Nb_{13.999}Ta_{0.001}TiO_{37}$ | 13.999 | x = 0.001, y = 0 | Monoclinic $Nb_{14}TiO_{37}$ | K/100 | 111 | 1.11 |
| Example 28 | $Nb_{13.99}Ta_{0.01}TiO_{37}$ | 13.99 | x = 0.01, y = 0 | Monoclinic $Nb_{14}TiO_{37}$ | K/500, P/500 | 108 | 1.14 |
| Example 29 | $Nb_{13.9}Ta_{0.1}TiO_{37}$ | 13.9 | x = 0.1, y = 0 | Monoclinic $Nb_{14}TiO_{37}$ | K/500, P/500, Fe/500 | 109 | 1.12 |
| Example 30 | $Nb_{23.999}Ta_{0.001}TiO_{62}$ | 23.999 | x = 0.001, y = 0 | Monoclinic $Nb_{24}TiO_{62}$ | K/100 | 110 | 1.23 |
| Example 31 | $Nb_{23.99}Ta_{0.01}TiO_{62}$ | 23.99 | x = 0.01, y = 0 | Monoclinic $Nb_{24}TiO_{62}$ | K/500, P/500 | 107 | 1.22 |
| Example 32 | $Nb_{23.9}Ta_{0.1}TiO_{62}$ | 23.9 | x = 0.1, y = 0 | Monoclinic $Nb_{24}TiO_{62}$ | K/500, P/500, Fe/500 | 106 | 1.25 |
| Example 33 | $Nb_2Sn_{0.5}Ti_{0.5}O_7$ | 4 | z = 0.5 | Monoclinic $Nb_2TiO_7$ | K/100, P/500 | 95 | 0.95 |
| Example 34 | $Nb_{9.5}V_{0.5}ZrTiO_{29}$ | 9.5 | x = 0.5, y = 1 | Monoclinic $Nb_{10}Ti_2O_{29}$ | K/500, P/500 | 102 | 1.29 |
| Example 35 | $Nb_{12.9}TaW_{0.1}Ti_{0.9}Hf_{0.1}O_{37}$ | 14.33 | x = 1.1, y = 0.1 | Monoclinic $Nb_{14}TiO_{37}$ | K/500, P/500 | 97 | 1.32 |
| Example 36 | $Nb_{11.5}Ta_{2.5}Ti_{0.6}Zr_{0.4}O_{37}$ | 19.17 | x = 2.5, y = 0.4 | Monoclinic $Nb_{14}TiO_{37}$ | K/500, P/500 | 97 | 1.33 |
| Example 37 | $Nb_{19}Ta_{4.9}Mo_{0.1}Ti_{0.7}Sn_{0.3}O_{62}$ | 27.14 | x = 5, y = 0.3 | Monoclinic $Nb_{24}TiO_{62}$ | K/500, P/500 | 95 | 1.28 |
| Comparative Example 1 | $Nb_{10}Ti_2O_{29}$ | 5 | x = 0, y = 0 | Monoclinic $Nb_{10}Ti_2O_{29}$ | None | 77 | 1.61 |
| Comparative Example 2 | $Nb_{10}Ti_2O_{29}$ | 5 | x = 0, y = 0 | Monoclinic $Nb_{10}Ti_2O_{29}$ | K/50 | 78 | 1.5 |
| Comparative Example 3 | $Nb_{10}Ti_2O_{29}$ | 5 | x = 0, y = 0 | Monoclinic $Nb_{10}Ti_2O_{29}$ | K/2200 | 94 | 1.51 |
| Comparative Example 4 | $Nb_{10}Ti_2O_{29}$ | 5 | x = 0, y = 0 | Monoclinic $Nb_{10}Ti_2O_{29}$ | Na/500 | 91 | 1.43 |
| Comparative Example 5 | $Nb_{2.01}Ti_{0.99}O_7$ | 2.03 | — | Monoclinic $Nb_2TiO_7$ | None | 85 | 1.32 |
| Comparative Example 6 | $Nb_{14}TiO_{37}$ | 14 | x = 0, y = 0 | Monoclinic $Nb_{14}TiO_{37}$ | None | 78 | 1.65 |
| Comparative Example 7 | $Nb_{24}TiO_{62}$ | 24 | x = 0, y = 0 | Monoclinic $Nb_{24}TiO_{62}$ | None | 74 | 1.58 |
| Comparative Example 8 | $Nb_{2.01}Ta_{0.001}Ti_{0.989}O_7$ | 2.03 | z = 0.011 | Monoclinic $Nb_2TiO_7$ | None | 89 | 1.25 |
| Comparative Example 9 | $Nb_{11.5}Ta_{2.5}Ti_{0.6}Zr_{0.4}O_{37}$ | 19.17 | x = 2.5, y = 0.4 | Monoclinic $Nb_{14}TiO_{37}$ | None | 83 | 1.53 |
| Comparative Example 10 | $Nb_2TiO_7$ | 2 | — | Monoclinic $Nb_2TiO_7$ | K/500 | 92 | 1.3 |

TABLE 4

| | Volume frequency 10% D10 (μm) | Volume frequency 50% D50 (μm) | Volume frequency 90% D90 (μm) | Ratio D10/D50 | Ratio D50/D90 | Electrode density (g/cm³) | 0.2 C discharge capacity (mAh/g) | 5 C/0.2 C discharge capacity ratio | Cycle capacity retention ratio (%) |
|---|---|---|---|---|---|---|---|---|---|
| Example 24 | 0.75 | 2.8 | 8.5 | 0.27 | 0.33 | 2.7 | 274.3 | 0.9 | 95.1 |
| Example 25 | 0.54 | 2.6 | 6.5 | 0.21 | 0.40 | 2.6 | 275.9 | 0.94 | 95.4 |
| Example 26 | 0.55 | 2.9 | 8.1 | 0.19 | 0.36 | 2.7 | 274.6 | 0.93 | 95 |
| Example 27 | 1.45 | 3.3 | 10.8 | 0.44 | 0.31 | 2.6 | 274.1 | 0.79 | 97.5 |
| Example 28 | 0.66 | 2.9 | 7.6 | 0.23 | 0.38 | 2.6 | 273.7 | 0.93 | 96.1 |
| Example 29 | 0.61 | 2.8 | 8.4 | 0.22 | 0.33 | 2.7 | 274.4 | 0.93 | 96.3 |
| Example 30 | 0.74 | 2.9 | 9.2 | 0.26 | 0.32 | 2.6 | 274.1 | 0.92 | 97.4 |
| Example 31 | 0.6 | 2.8 | 7.7 | 0.21 | 0.36 | 2.6 | 273.4 | 0.93 | 96.7 |
| Example 32 | 0.57 | 2.8 | 7.6 | 0.20 | 0.37 | 2.7 | 273.8 | 0.92 | 97.1 |
| Example 33 | 0.61 | 2.9 | 8.4 | 0.21 | 0.35 | 2.6 | 260.4 | 0.96 | 96.5 |
| Example 34 | 0.66 | 2.8 | 9 | 0.24 | 0.31 | 2.6 | 258.8 | 0.95 | 95.4 |
| Example 35 | 0.48 | 2.5 | 6.8 | 0.19 | 0.37 | 2.7 | 259.2 | 0.97 | 95.1 |
| Example 36 | 0.51 | 2.6 | 7.2 | 0.20 | 0.36 | 2.6 | 264.9 | 0.95 | 94.8 |
| Example 37 | 0.39 | 2.3 | 7.4 | 0.17 | 0.31 | 2.7 | 263.8 | 0.96 | 95.6 |
| Comparative Example 1 | 0.12 | 2.7 | 16.6 | 0.04 | 0.16 | 2.3 | 245.8 | 0.56 | 44.7 |
| Comparative Example 2 | 0.28 | 2.6 | 12.2 | 0.11 | 0.21 | 2.3 | 254.2 | 0.67 | 66.4 |
| Comparative Example 3 | 0.26 | 3.1 | 31.4 | 0.08 | 0.10 | 2.4 | 237.7 | 0.42 | 39.4 |
| Comparative Example 4 | 0.31 | 2.7 | 10.3 | 0.11 | 0.26 | 2.4 | 230.6 | 0.66 | 48.1 |
| Comparative Example 5 | 0.2 | 2.5 | 11.3 | 0.08 | 0.22 | 2.3 | 252.3 | 0.63 | 65.3 |
| Comparative Example 6 | 0.18 | 2.8 | 15.8 | 0.06 | 0.18 | 2.2 | 239.5 | 0.57 | 55.8 |
| Comparative Example 7 | 0.15 | 2.9 | 17.5 | 0.05 | 0.17 | 2.2 | 238.9 | 0.55 | 56.1 |
| Comparative Example 8 | 0.19 | 2.8 | 10.7 | 0.07 | 0.26 | 2.3 | 249.1 | 0.6 | 68.5 |
| Comparative Example 9 | 0.18 | 2.9 | 15.1 | 0.06 | 0.19 | 2.3 | 235.4 | 0.58 | 54.2 |
| Comparative Example 10 | 0.45 | 2.4 | 10.1 | 0.19 | 0.24 | 2.4 | 258.1 | 0.65 | 72.7 |

The column "quantities of x, y, z in the general formula" shown in Tables 1 and 3 will be described.

When the crystal phase forming the niobium-titanium composite oxide according to the corresponding Example is "monoclinic $Nb_2TiO_7$", z refers to the quantity of z in the general formula $Nb_2M2_zTi_{1-z}O_7$ described in the first embodiment. Here, M2 is at least one kind of additive element selected from the group consisting of Nb, Ta, Zr, Hf and Sn, and z satisfies 0<z<1.

When the crystal phase forming the niobium-titanium composite oxide according to the corresponding Example is "monoclinic $Nb_{10}Ti_2O_{29}$", x and y refer to the quantities of x and y in the general formula $Nb_{10-x}M1_xTi_{2-y}M2_yO_{29}$ described in the first embodiment. When the crystal phase forming the niobium-titanium composite oxide according to the corresponding Example is "monoclinic $Nb_{14}TiO_{37}$", x and y refer to the quantities of x and y in the general formula $Nb_{14-x}M1_xTi_{1-y}M2_yO_{37}$ described in the first embodiment. When the crystal phase forming the niobium-titanium composite oxide according to the corresponding Example is "monoclinic $Nb_{24}TiO_{62}$", x and y refer to the quantities of x and y in the general formula $Nb_{24-x}M1_xTi_{1-y}M2_yO_{62}$ described in the first embodiment. In the above general formulae, M1 is at least one kind of additive element selected from the group consisting of Ta, Ti, V, Mo and W; M2 is at least one kind of additive element selected from the group consisting of Nb, Ta, Zr, Hf and Sn; x satisfies 0≤x≤5; and y satisfies 0≤y<1.0.

The following matters can be read from Tables 1 to 4.

Examples 1 to 6 demonstrate that, as the concentration of the element A (here, K) increases, the grinding tends to be performed more easily. For example, as the concentration of the element A increased, D10, D50 and D90 tended to decrease. Further, from the values of D10 in Examples 1 to 6, it can be seen that the mixing of fine powder having a size of 0.2 μm or less is suppressed.

Examples 7 to 8 demonstrate that when Fe or P is contained as the element A, the same effect is obtained as that when K is contained.

Since D10 is greater than 2.0 μm in Example 9, the rapid discharge performance can be understood to be inferior to those of the other Examples. On the other hand, in Example 10, since D10 is smaller than 0.3 μm, the cycle life performance can be understood to be inferior to those of the other examples although the rapid discharge performance is excellent.

Similarly, in Example 11, since D90 is larger than 30 μm, the rapid discharge performance can be understood to be inferior to those of the other examples. On the other hand, in Example 12, it can be seen that the cycle life performance tended to be inferior to those of the other examples because D90 was smaller than 5 μm.

Examples 13 to 18 demonstrate that electrode materials, even when containing a niobium-titanium composite oxide having an Nb/Ti ratio of greater than 2 and other than 5, exhibited excellent rapid charge-discharge characteristics and cycle life characteristics because they contained the element A at a concentration of 100 ppm to 2000 ppm.

Examples 19 to 32 demonstrate that, by further inserting Ta into the crystal of the niobium-titanium composite oxide, the charge-discharge capacity tended to be larger while excellent rapid charge-discharge characteristics and cycle life characteristics were maintained.

Examples 33 to 37 demonstrate a tendency that the rapid charge-discharge characteristics increased because the niobium-titanium composite oxide contained a dopant element other than Nb, Ti and Ta.

The electrode materials according to Comparative Examples 1 and 5 to 9 contained a niobium-titanium composite oxide having an average composition in which the Nb/Ti ratio was greater than 2, but did not contain the element A. As a result, the crystallite diameter was smaller, and D10 was also smaller than in the Examples, and thus a large amount of fine powder was generated during grinding. Therefore, all of the discharge capacity, the rapid charge-discharge characteristics, and the cycle life characteristic were lower than those in the Examples.

As shown in Comparative Examples 2 and 3, the electrode materials in which the element A was not contained at a concentration of 100 ppm to 2000 ppm did not have excellent battery characteristics. For example, in Comparative Example 3, because of an excessively high concentration of K, only a specific crystal axis grew and a large amount of coarse particles were contained. As a result, not only the rapid charge-discharge characteristics and cycle life characteristics, but also the discharge capacity was low.

As shown in Comparative Example 4, even when the electrode material contained Na at a concentration of 500 ppm, neither the rapid charge-discharge characteristics nor the cycle life characteristics were improved.

As shown in Comparative Example 10, when the Nb/Ti ratio was 2, no improvement in rapid charge-discharge characteristics or cycle life characteristics was observed even when K as the element A was contained at a concentration of 500 ppm. This is thought to be because, in the composition with an Nb/Ti ratio of 2, it is difficult to generate aggregated particles due to particle growth, and it is also difficult to generate fine powder during grinding, so the effect obtained by adding K is difficult to see.

According to at least one embodiment and example described above, an electrode material is provided. The electrode material includes active material particle containing: a niobium-titanium composite oxide having an average composition in which a molar ratio of niobium to titanium $(Mm/M_{Ti})$ is greater than 2; and at least one element A selected from the group consisting of potassium, iron and phosphorus. The active material particle contain the element A at a concentration in the range of 100 ppm to 2000 ppm. This electrode material includes active material particle having high crystallinity and a stable basic skeleton, has a low proportion of fine powder, and thus can exhibit excellent rapid charge-discharge characteristics and cycle life characteristics.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electrode material comprising active material particles, wherein the active material particles comprise:
   a niobium-titanium composite oxide having an average composition in which a molar ratio of niobium to titanium $(M_{Nb}/M_{Ti})$ is greater than 2; and
   at least one element A selected from the group consisting of potassium, iron and phosphorus,
   wherein the active material particles comprise the at least one element A at a concentration in a range of 100 ppm to 2000 ppm, and the concentration of the at least one element A represents mass [mg/kg] of the at least one element A contained in the active material particles,
   wherein the active material particles have a ratio of D10/D50 to D50/D90 ((D10/D50)/(D50/D90)) which is less than 0.6 in a grain size distribution chart according to a laser diffraction/scattering method.

2. The electrode material according to claim 1, wherein the niobium-titanium composite oxide comprises at least one crystal phase selected from the group consisting of an $Nb_2TiO_7$ phase having a composition in which the molar ratio of niobium to titanium $(M_{Nb}/M^{Ti})$ is greater than 2, an $Nb_{10}Ti_2O_{29}$ phase, an $Nb_{14}TiO_{37}$ phase and an $Nb_{24}TiO_{62}$ phase.

3. The electrode material according to claim 1,
   wherein the niobium-titanium composite oxide comprises an $Nb_2TiO_7$ phase having a composition in which the molar ratio of niobium to titanium $(M_{Nb}/M_{Ti})$ is greater than 2,
   a diffraction diagram for the niobium-titanium composite oxide obtained by powder X-ray diffraction using a Cu-Kα radiation source has a high-angle side peak $P_H$ and a low-angle side peak $P_L$ in a range of $2\theta=44°\pm1.0°$, and
   a ratio $(I_H/I_L)$ of a peak intensity $I_H$ of the high-angle side peak $P_H$ to a peak intensity $I_L$ of the low-angle side peak $P_L$ is less than 1.

4. The electrode material according to claim 1,
   wherein the niobium-titanium composite oxide comprises at least one crystal phase selected from the group consisting of an $Nb_{10}Ti_2O_{29}$ phase, an $Nb_{14}TiO_{37}$ phase and an $Nb_{24}TiO_{62}$ phase,
   a diffraction diagram for the niobium-titanium composite oxide obtained by powder X-ray diffraction using a Cu-Kμ radiation source has a high-angle side peak $P_H$ and a low-angle side peak $P_L$ in a range of $2\theta=44°\pm1.0°$, and
   a ratio $(I_H/I_L)$ of a peak intensity $I_H$ of the high-angle side peak $P_H$ to a peak intensity $I_L$ of the low-angle side peak $P_L$ is less than 1.5.

5. The electrode material according to claim 1, wherein a crystallite diameter of the niobium-titanium composite oxide is in a range of 95 nm to 130 nm.

6. The electrode material according to claim 1,
   wherein the active material particles have D10 in a range of 0.3 μm to 2.0 μm in the grain size distribution chart obtained by the laser diffraction/scattering method.

7. The electrode material according to claim 1,
   wherein the active material particles have D90 in a range of 5 μm to 30 μm in the grain size distribution chart obtained by the laser diffraction/scattering method.

8. The electrode material according to claim 1,
   wherein the active material particles have a ratio of D10 to D50 (D10/D50) in a range of 0.10 to 0.60 and a ratio of D50 to D90 (D50/D90) in a range of 0.20 to 0.50 in the grain size distribution chart obtained by the laser diffraction/scattering method.

9. The electrode material according to claim 1,
   wherein the niobium-titanium composite oxide comprises at least one compound selected from the group consisting of general formula $Nb_2M2_zTi_{1-z}O_7$, general formula $Nb_{10-x}M1_xTi_{2-y}M2_yO_{29}$, general formula $Nb_{14-x}M1_xTi_{1-y}M2_yO_{37}$, and general formula $Nb_{24-x}M1_xTi_{1-y}M2_yO_{62}$, and the M1 is at least one element selected from the group consisting of Ta, Ti, V, Mo and W; the M2 is at least one element selected from the group consisting of Nb, Ta, Zr, Hf and Sn; the x satisfies $0 \leq x \leq 5$; the y satisfies $0 \leq y \leq 1.0$, and the z satisfies $0 < z < 1$.

10. An electrode comprising the electrode material according to claim 1.

11. The electrode according to claim 10, wherein the electrode comprises an active material-containing layer comprising the electrode material.

12. A secondary battery comprising:
    a positive electrode;
    a negative electrode; and
    an electrolyte,
    wherein the negative electrode is the electrode according to claim 10.

13. A battery pack comprising the secondary battery according to claim 12.

14. The battery pack according to claim 13, further comprising:
    an external power distribution terminal; and
    a protective circuit.

15. The battery pack according to claim 13, comprising a plurality of the secondary battery, wherein the secondary batteries are electrically connected in series, in parallel, or in combination of in series and in parallel.

16. A vehicle comprising the battery pack according to claim 13.

17. The vehicle according to claim 16, which comprises a mechanism configured to convert kinetic energy of the vehicle into regenerative energy.

18. The electrode material according to claim 1,
    wherein the at least one element A is present in a higher concentration at a particle interface of the active material particle.

19. The electrode material according to claim 1,
    wherein the at least one element A comprises potassium.

20. The electrode material according to claim 1,
    wherein the at least one element A comprises potassium and phosphorus.

\* \* \* \* \*